United States Patent
Beidas

(10) Patent No.: US 11,632,150 B2
(45) Date of Patent: Apr. 18, 2023

(54) WEATHER-RESILIENT COUNTERMEASURES FOR LINE-OF-SIGHT MULTIPLE-INPUT MULTIPLE-OUTPUT FEEDER LINKS IN MULTIBEAM SATELLITE SYSTEMS

(71) Applicant: Bassel F. Beidas, Germantown, MD (US)

(72) Inventor: Bassel F. Beidas, Germantown, MD (US)

(73) Assignee: Hughes Network Systems, Germantown, MD (US)

( * ) Notice: Subject to any disclaimer, the term of this patent is extended or adjusted under 35 U.S.C. 154(b) by 9 days.

(21) Appl. No.: 17/452,547

(22) Filed: Oct. 27, 2021

(65) Prior Publication Data

US 2022/0321177 A1 Oct. 6, 2022

Related U.S. Application Data

(60) Provisional application No. 63/169,773, filed on Apr. 1, 2021.

(51) Int. Cl.
*H04B 7/0413* (2017.01)
*H04B 17/336* (2015.01)
(Continued)

(52) U.S. Cl.
CPC ......... *H04B 7/0413* (2013.01); *H04B 7/0626* (2013.01); *H04B 7/18513* (2013.01); *H04B 7/19* (2013.01); *H04B 17/336* (2015.01)

(58) Field of Classification Search
CPC .. H04B 7/0413; H04B 17/336; H04B 7/0626; H04B 7/18513; H04B 7/19
See application file for complete search history.

(56) References Cited

U.S. PATENT DOCUMENTS

| | | | |
|---|---|---|---|
| 2002/0197958 A1* | 12/2002 | Collins | H04B 7/18513 455/296 |
| 2013/0114648 A1* | 5/2013 | Bittner | H04W 24/02 375/211 |

(Continued)

OTHER PUBLICATIONS

Delamotte Thomas: "MIMO Feeder Links for Very High Throughput Satellite Systems", Dissertation, Dec. 19, 2019 (Dec. 19, 2019), pp. 1-144, XP055936702, Munich, Germany Retrieved from the Internet: URL:https://athene-forschung.unibw.de/doc/134066/134066.pdf [retrieved on Jun. 29, 2022].

(Continued)

*Primary Examiner* — Janice N Tieu
(74) *Attorney, Agent, or Firm* — Capitol City TechLaw; Jasbir Singh

(57) ABSTRACT

A system and method for providing multi-input multi-output (MIMO) feeder links for a multibeam satellite system. The method includes configuring a X×Y MIMO antenna system using X-antennae having dominant line-of-sight (LoS) of Y-antennae; transmitting, simultaneously, a Tx signal as X Tx signals on a MIMO channel with the X-antennae; receiving the X Tx signals on the MIMO channel with the Y-antennae as Y Rx signals, wherein each of the Y-antennae generate one of the Y Rx signals; and ground-interference processing the X Tx signals or the Y Rx signals to recover the Tx signal; satellite-interference processing the X Tx signals or the Y Rx signals to recover the Tx signal. In the method, the ground interference processing includes countermeasures as either pre-interference processing when the X-antennae are disposed on a ground or post-interference processing when the X-antennae are disposed in a Geosynchronous orbit satellite. Gateway diversity for multiple MIMO feeder links utilizing these countermeasures improves weather-resiliency and significantly enhances overall satellite network availability.

17 Claims, 16 Drawing Sheets

(51) Int. Cl.
  *H04B 7/19* (2006.01)
  *H04B 7/185* (2006.01)
  *H04B 7/06* (2006.01)

(56) References Cited

U.S. PATENT DOCUMENTS

| | | | |
|---|---|---|---|
| 2016/0218796 A1* | 7/2016 | Ryu | H04B 7/18513 |
| 2016/0302207 A1* | 10/2016 | Vasavada | H04W 72/0473 |
| 2018/0103381 A1* | 4/2018 | Ramamurthi | H04W 36/0016 |
| 2018/0241464 A1* | 8/2018 | Michaels | H04W 56/0045 |

OTHER PUBLICATIONS

Interntaional Search Report for PCT Application No. PCT/US2022/071454.

Wang Ji et al: "Multicast Precoding for Multigateway Multibeam Satellite Systems With Feeder Link Interference", IEEE Transactions On Wireless Communications, IEEE Service Center, Piscataway, NJ, US, vol. 18, No. 3, Mar. 1, 2019 (Mar. 1, 2019), pp. 1637-1650, XP011714709, ISSN: 1536-1276, DOI:10.1109/TWC.2019.2894823 [retrieved on Mar. 11, 2019].

Zhi Wen Si et al: "Rate-Splitting Multiple Access for Multigateway Multibeam Satellite Systems with Feeder Link Interference", arxiv.org, Cornell University Library, 201 Olin Library Cornell University Ithaca, NY 14853, Feb. 11, 2021 (Feb. 11, 2021), XP081881037.

\* cited by examiner

WEATHER-RESILIENT COUNTERMEASURES FOR LINE-OF-SIGHT MULTIPLE-INPUT MULTIPLE-OUTPUT FEEDER LINKS IN MULTIBEAM SATELLITE SYSTEMS

CROSS-REFERENCE TO RELATED APPLICATIONS AND INCORPORATION BY REFERENCE

The present application claims the benefit under 35 U.S.C. 119(e) of U.S. Provisional Application Ser. No. 63/169,773, filed Apr. 1, 2021, which is incorporated herein by reference in its entirety.

FIELD

A method and multibeam satellite system achieving substantial orthogonality between spatially multiplexed signals with multiple multi-input multi-output (MIMO) feeder links operating in line-of-sight (LoS) channels using essentially a common spot beam per link is disclosed. Countermeasures against inter-antenna interference based on linear pre-interference and post-interference signal processing provide gains in signal-to-noise ratio, spatial multiplexing, and spatial diversity. Comparisons of linear versus circular pattern spacing for a gateway cluster, including variations in gateway array orientations, provide flexibility in locating gateway installation sites. Gateway diversity for multiple MIMO feeder links utilizing these countermeasures improves weather-resiliency and significantly enhances overall satellite network availability.

BACKGROUND

The prior art multibeam satellite systems using MIMO require scatter-rich channels, such as typically found in terrestrial wireless networks. Moreover, low-Earth orbit (LEO) applications operate in a scatter-rich environment, resulting from Ricean fading with a low Rice factor. However, LoS conditions, rather than scatter-rich, are encountered in geostationary satellite systems, traditionally limiting the usefulness of MIMO for geostationary Earth orbit (GEO) applications.

Some prior art satellites systems use multiple satellites with one MIMO antenna each, a very costly alternative. Other prior art systems employ smart gateway diversity but only using Single In Single Out (SISO) feeder links, not taking advantage of cooperation among the multiple transmit and receive antennas.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings achieve substantial spatial orthogonality of independent signals transmitted in MIMO-enabled satellite systems with LoS channels, when these signals use the same time, frequency, and polarization resources. A single satellite with multiple reflectors is needed. For a given geographic area, the teachings allow more gateways to be placed with acceptable interference levels among them. For a given availability requirement, significantly enhanced overall satellite network availability against severe weather impairments relative to state-of-the-art SISO feeder links can be achieved.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for providing multi-input multi-output (MIMO) feeder links for a multibeam satellite system. The method includes configuring a X×Y MIMO antenna system using X-antennae having dominant line-of-sight (LoS) of Y-antennae; transmitting, simultaneously, a Tx signal as X Tx signals on a MIMO channel with the X-antennae; receiving the X Tx signals on the MIMO channel with the Y-antennae as Y Rx signals, wherein each of the Y-antennae generate one of the Y Rx signals; and ground-interference processing the X Tx signals or the Y Rx signals to recover the Tx signal; satellite-interference processing the X Tx signals or the Y Rx signals to recover the Tx signal. In the method the ground interference processing includes countermeasures as either pre-interference processing when the X-antennae are disposed on a ground or post-interference processing when the X-antennae are disposed in a Geosynchronous orbit satellite, the satellite interference processing includes a passthrough when a respective Signal-to-Interference-and-Noise Ratio (SINR) of each of the Y Rx signals is greater than a threshold, and a channel capacity of the MIMO channel is greater than a channel capacity of a Single-Input Single-Output (SISO) channel having resources identical to the MIMO channel. Implementations may include one or more of the following features.

The method where X and Y are equal.

The method where the satellite interference processing includes countermeasures when the respective SINR of each of the Y Rx signals is less than or equal to the threshold.

The method where the countermeasures are based on one or more of, a weighted or non-weighted version of, a Zero-Forcing (ZF) criteria, a Minimum Mean-Square Error (MMSE) criteria, or a regularized ZF (RZF) criteria.

The method where the countermeasures are based on high-quality channel state information (CSI) about signal propagation on the MIMO channel.

The method where the Y-antennae are disposed in the Geosynchronous orbit satellite, the respective SINR of each of the Y Rx signals less than or equal to the threshold, the satellite interference processing includes countermeasures, the ground interference processing uses an identity matrix, and weather between one of the X-antennae and the Y-antennae exceeds a precipitation-induced outage limit.

The method where the Y-antennae are disposed on the ground, the respective SINR of each of the Y Rx signals less than or equal to the threshold, the satellite interference processing includes a passthrough, the ground interference processing uses a non-identity matrix, and weather between one of the X-antennae and the Y-antennae exceeds a precipitation-induced outage limit.

The method where when weather, between Z of the X-antennae and the Y-antennae, exceeds a precipitation-induced outage limit, Z diversity antennae are substituted for the one of the X-antennae or the Y-antennae on the ground, the X×Y MIMO antenna system operates as a (X−Z)×Y or X×(Y−Z) MIMO antenna system, and Z is greater than or equal to 1.

The method where the X-antennae form a cluster, the multibeam satellite system includes M clusters, associating each of the M clusters with a respective Tx signal, each of the clusters transmitting over the MIMO channel simultaneously, M times the channel capacity of the MIMO channel is greater than M times the channel capacity of the SISO channel, and M is greater than 1.

The method where the clusters are separated from each other by a distance greater than 100 kilometers.

The method where either the Y-antennae or the X-antennae are spaced in a substantially linear formation on the ground and spaced from one another by a distance of less than 50 kilometers.

The method where either the Y-antennae or the X-antennae are spaced in a substantially circular formation on the ground and spaced from one another by a distance of less than 50 kilometers.

The method where either the Y-antennae or the X-antennae are spaced in a substantially linear formation on the Geosynchronous orbit satellite.

The method where either the Y-antennae or the X-antennae are spaced in a substantially circular formation on the Geosynchronous orbit satellite.

The method where the X-antennae are interconnected via a fiber or microwave link, and spaced on the ground within an acceptable range of an optimal position.

The method where the Y-antennae are interconnected via a fiber or microwave link, and spaced on the ground within an acceptable range of an optimal position.

The method where the X Tx signals are substantially orthogonal at the Y-antennae.

The method where implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1A:
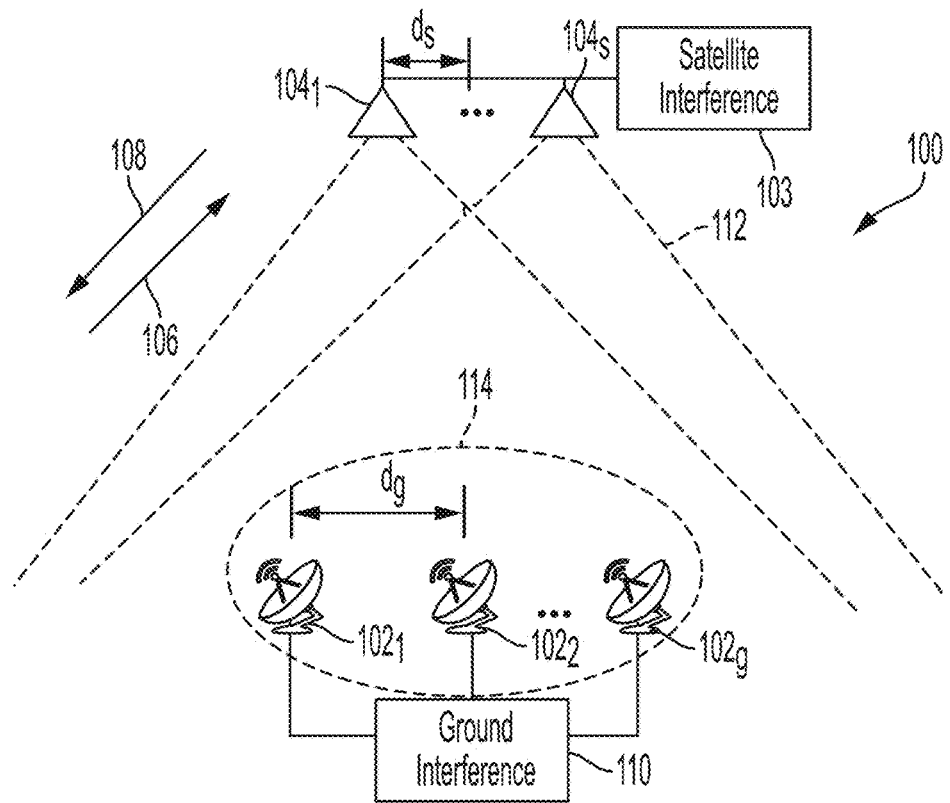
FIG. 1A illustrates a MIMO-enabled feeder link for a multibeam satellite system including a cluster using a linear formation according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Introduction

The present teachings achieve substantial spatial orthogonality of independent signals transmitted in MIMO-enabled satellite systems with LoS channels, when these signals use the same time, frequency, and polarization resources. A single satellite with multiple reflectors is needed. For a given geographic area, the teachings allow more gateways to be placed with acceptable interference levels among them. For a given availability requirement, significantly enhanced overall satellite network availability against severe weather impairments relative to state-of-the-art SISO feeder links can be achieved.

Herein, a gateway refers to an antenna and a Radio Frequency Transceiver (RFT). The RFT may be connected to a data processor, via microwaves, fiber, or the like. The gateway may be remote from the data processor. For MIMO implementations, a group of gateways form a cluster. Each gateway of a cluster connects to the same data processor. Each gateway of a cluster is disposed on the ground in the same general vicinity, for example, Nevada, Montana. Optimal distances between adjacent gateways of a cluster may range from 10 to hundred kilometers. Distances between clusters may range in 100s of kilometers. The gateways of a cluster may be disposed in a linear, circular, or other polygon shaped configuration.

Due to the susceptibility of extremely high frequency (EHF) band to weather impairments, a multiple gateway configuration provides gateway diversity. P diversity MIMO feeder links maybe added per N primary feeder links to achieve redundancy. Data rerouting from one gateway to another may be implemented when experiencing deep rainfall events to meet overall network availability targets. The MIMO-enabled feeder links offer large margin of protection against rain attenuation, resulting in greatly enhanced overall satellite network availability, when compared with the prior art single-input single-output (SISO) feeder links.

FIG. 1A illustrates a MIMO-enabled feeder link for a multibeam satellite system including a cluster using a linear formation according to various embodiments.

FIG. 1A illustrates an exemplary satellite network 100 that implements feeder links using a $M_g \times M_s$ MIMO including a cluster 114. Satellite network 100 includes $M_s$ satellite antennae $104_0$ to $104_s$ at a satellite (not shown) separated by a distance $d_s$ that are radiating $M_s$ highly overlapping beams 112. The $M_s$ satellite antennae $104_0$ to $104_s$ are connected to a satellite interference processor 103. A ground portion of the satellite network 100 includes the cluster 114 including $M_g$ gateways $102_0$ to $102_g$ separated by a distance $d_g$ and disposed in a linear formation. Although, the satellite antennae $104_0$ to $104_s$ are illustrated in a linear formation, circular or other formations may be used. The $M_g$ gateways $102_0$ to $102_g$ are inter-connected to a ground interference processor 110. The ground interference processor 110 may be disposed at a data processing center. Each of the $M_g$ gateways $102_0$ to $102_g$ serves the $M_s$ satellite antennae $104_0$ to $104_s$ simultaneously, and vice-versa. Both uplinks 106 and downlinks 108 on the feeder side are provided by the beams 112. For uplinks 106, the gateways $102_0$ to $102_g$ may radiate multiple LoS and highly overlapping beams (not shown, for example, 3 beams in the 3×3 MIMO formation) towards the satellite antennae $104_0$ to $104_s$. For downlinks 108, the satellite antennae $104_0$ to $104_s$ may radiate multiple LoS and highly overlapping beams 112 towards the gateways $102_0$ to $102_g$. In some embodiments, the gateways $102_0$ to $102_g$ include multi-feed antennae. In some embodiments, the satellite antennae $104_0$ to $104_s$ include multi-feed antennae.

Figure 1B:
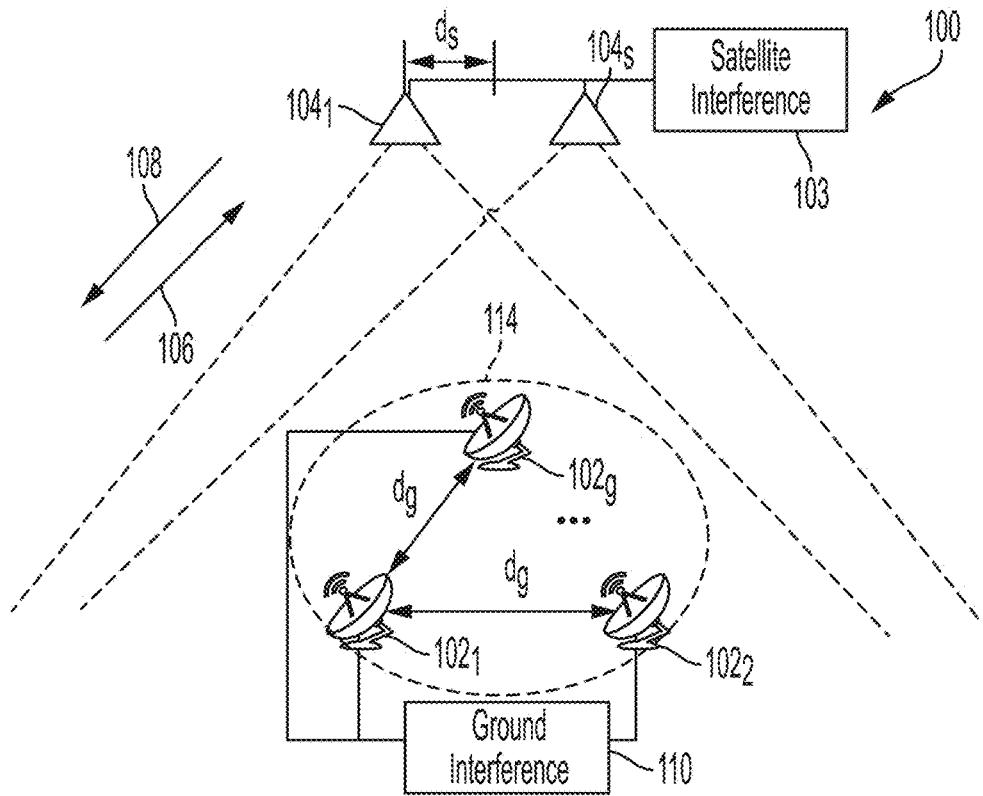
FIG. 1B illustrates a MIMO-enabled feeder link for a multibeam satellite system including a cluster using a circular formation according to various embodiments.

FIG. 1B illustrates a MIMO-enabled feeder link for a multibeam satellite system including a cluster using a circular formation according to various embodiments.

FIG. 1B illustrates an exemplary satellite network 100 that implements feeder links using a $M_g \times M_s$ MIMO including a cluster 114. Satellite network 100 includes $M_s$ satellite antennae $104_0$ to $104_s$ at a satellite (not shown) separated by a distance $d_s$ that are radiating $M_s$ highly overlapping beams 112. The $M_s$ satellite antennae $104_0$ to $104_s$ are connected to a satellite interference processor 103. A ground portion of the satellite network 100 includes the cluster 114 including $M_g$ gateways $102_0$ to $102_g$ separated by a distance $d_g$ and disposed in a circular formation. The $M_g$ gateways $102_0$ to $102_g$ are arranged to form a triangle on the ground for illustration only. The $M_g$ gateways $102_0$ to $102_g$ are inter-connected to a ground interference processor 110. The ground interference processor 110 may be disposed at a data processing center. Each of the $M_g$ gateways $102_0$ to $102_g$ serves the $M_s$ satellite antennae $104_0$ to $104_s$ simultaneously, and vice-versa. Both uplinks 106 and downlinks 108 on the feeder side are provided by the beams 112.

Figure 1C:
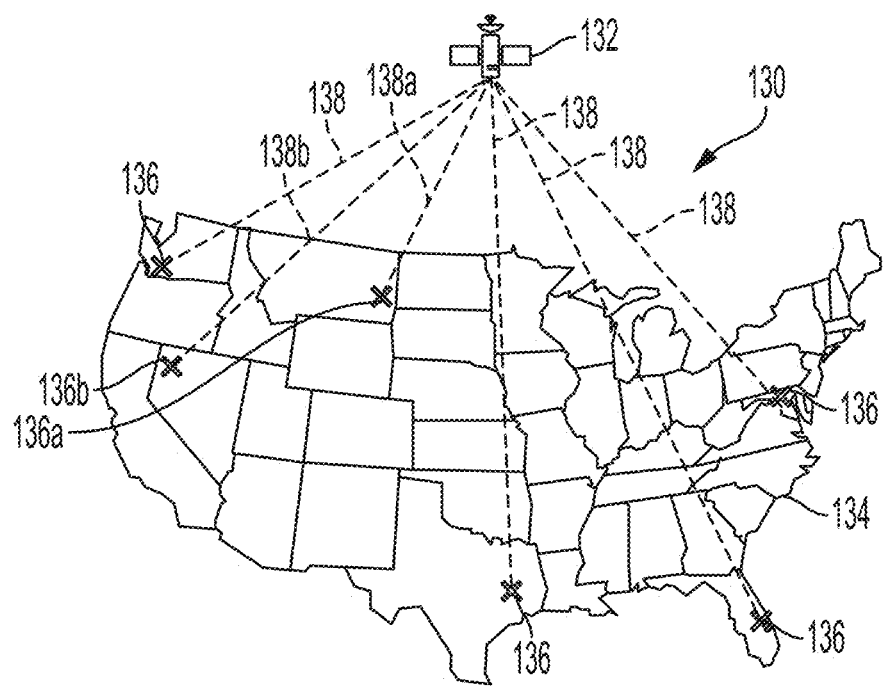
FIG. 1C illustrates a multibeam satellite system including multiple clusters according to various embodiments.

FIG. 1C illustrates a multibeam satellite system including multiple clusters according to various embodiments.

A multibeam satellite system 130 may include a satellite 132 and clusters 136 disposed around a coverage area 134. The satellite 132 may include $M_s$ antennae (not shown). Each cluster 136 may include $M_g$ gateways (not shown). Gateways of each cluster 136 may be disposed in a formation dictated by the local geography. Gateways of each cluster 136 may be disposed in a formation different than formations used by other clusters. Gateways of more than one of the clusters 136 may use the same resources, for example, satellite, frequency, time, polarization, to communicate with the $M_s$ satellite antennae using beams 138. Each of the beams 138 may have been subjected to countermeasures described herein.

Exemplary cluster placements in the coverage area 134 are used below for ease of description and are not limiting. Assuming that cluster 136a of Montana, US and cluster 136b of Nevada, US use the same resources. Beams 138a communicate with each gateway of cluster 136a. Beams 138a are based on a first source signal (not shown), either received or transmitted simultaneously by the gateways of the cluster 136a, being processed by a first data processor (not shown) provided for the cluster 136a. Similarly beams 138b are based on a second source signal processed by a second data processor that is different than the first data processor. The first source signal is different than the second source signal. Although, the beams 138a of each gateway of the cluster 136a are based on the first source signal, each of the beams 138a conveyed by the multibeam satellite system 130 may be distinct as each may have been subjected to different countermeasures described herein. Other beams 138 are formed in the manner beam 138a are formed.

System Model

A geostationary Earth-orbiting (GEO) satellite system on a feeder-link side, in both the uplink and downlink directions, may benefit from a LoS MIMO capability. The satellite may be equipped with $M_s$ multi-feed reflector antennas with high directivity. A ground network may include a group of $M_g$ gateways cooperating via terrestrial inter-connections to data processors. The gateways may share the same time, frequency, and polarization resources. A total of N such MIMO-enabled feeder links may be used throughout the coverage area to provide a massive overall satellite network throughput. The separation of the feeder links may be in tens of kilometers per FIG. 2A and FIG. 2B. Embodiments where the separation of the feeder links may be the order of hundreds of kilometers to reduce spatial interference among them may also be used. In some embodiments, the EHF range of the electromagnetic spectrum is utilized, including 81-86 GHz for the feeder uplink and 71-76 GHz on the feeder downlink.

FIG. 1A and FIG. 1B illustrate an individual MIMO-enabled feeder link in a multi-beam satellite system. A feed in each reflector antenna is used to point highly overlapping beams over a multiplicity of gateways, configured in either linear or circular formations. Assuming the orbital location of the satellite on the equator with a longitudinal slot of $\theta_s$ and a linear formation for the satellite antennae with uniform spacing of $d_{s,m}$ then the position vector, $\underline{\alpha}_{s,m}$ of the mth antenna in a 3D Cartesian coordinate system is $$\underline{\alpha}_{s,m} = \begin{bmatrix} R_s \cdot \cos(\theta_s) - d_{s,m} \cdot \sin(\theta_s) \\ R_s \cdot \sin(\theta_s) + d_{s,m} \cdot \cos(\theta_s) \\ 0 \end{bmatrix}, \quad (1)$$

where $R_s$ is the GEO radius, and $d_{s,m}$ is the spacing between the center of the antenna array onboard the satellite and its mth antenna m=1, 2, . . . , $M_s$, where $$d_{s,m} = d_s \cdot \left(m - \frac{1}{2} - \frac{M_s}{2}\right). \quad (2)$$

On the ground, the cluster of gateways can be configured in two different formations: linear versus circular. For the linear spacing pattern illustrated in FIG. 1A, the uniform spacing for the nth feeder link is $d_g^{(n)}$. The center of the gateway cluster has latitude and longitude coordinates of $\Phi_g^{(n)}$ and $\theta_g^{(n)}$, respectively, whereas the orientation $\delta_g^{(n)}$ is the angle between the east-west direction and the gateway cluster. Then, the position vector, $\underline{\alpha}_{g,m}^{(n)}$, of the mth gateway belonging to the nth feeder link in a 3D Cartesian coordinate system is $$\underline{\alpha}_{g,m}^{(n)} = \begin{bmatrix} R_g \cos(\phi_g^{(n)}) \cos(\theta_g^{(n)}) - d_{g,m}^{(n)} (\sin(\theta_g^{(n)}) \cos(\delta_g^{(n)}) + \\ \sin(\phi_g^{(n)}) \cos(\theta_g^{(n)}) \sin(\delta_g^{(n)})) \\ R_g \cos(\phi_g^{(n)}) \sin(\theta_g^{(n)}) + d_{g,m}^{(n)} (\cos(\theta_g^{(n)}) \cos(\delta_g^{(n)}) - \\ \sin(\phi_g^{(n)}) \sin(\theta_g^{(n)}) \sin(\delta_g^{(n)})) \\ R_g \sin(\phi_g^{(n)}) + d_{g,m}^{(n)} \cos(\phi_g^{(n)}) \sin(\delta_g^{(n)}) \end{bmatrix}, \quad (3)$$

where $R_g$ is the Earth radius and $d_{g,m}^{(n)}$ is the spacing between the center of the gateway cluster and the mth gateway m=1, 2, . . . , $M_s$ where $$d_{g,m}^{(n)} = d_g^{(n)} \cdot \left(m - \frac{1}{2} - \frac{M_g}{2}\right). \quad (4)$$

For the circular spacing pattern illustrated in FIG. 1(b), the gateways may be spaced with a separation of $d_g^{(n)}$ for the nth feeder link. Let $\Phi_g^{(n)}$ and $\theta_g^{(n)}$ be the latitude and longitude of the center of the gateway formation on the ground, respectively, whereas $\delta_g^{(n)}$ be the orientation associated with the first gateway relative to the East-West direction. Then, the position vector $\underline{\alpha}_{g,m}^{(n)}$, of the mth gateway belonging to the nth feeder link in a 3D Cartesian coordinate system and the orientation of the mth gateway are $$\underline{\alpha}_{g,m}^{(n)} = \begin{bmatrix} R_g \cos(\phi_g^{(n)}) \cos(\theta_g^{(n)}) - \frac{d_g^{(n)}}{2 \sin(\pi/M_g)} (\sin(\theta_g^{(n)}) \cos(\delta_{g,m}^{(n)}) + \\ \sin(\phi_g^{(n)}) \cos(\theta_g^{(n)}) \sin(\delta_{g,m}^{(n)})) \\ R_g \cos(\phi_g^{(n)}) \sin(\theta_g^{(n)}) + \frac{d_g^{(n)}}{2 \sin(\pi/M_g)} (\cos(\theta_g^{(n)}) \cos(\delta_{g,m}^{(n)}) - \\ \sin(\phi_g^{(n)}) \sin(\theta_g^{(n)}) \sin(\delta_{g,m}^{(n)})) \\ R_g \sin(\phi_g^{(n)}) + \frac{d_g^{(n)}}{2 \sin(\pi/M_g)} \cos(\phi_g^{(n)}) \sin(\delta_{g,m}^{(n)}) \end{bmatrix} \quad (5)$$

and $$\delta_{g,m}^{(n)} = \delta_g^{(n)} + \frac{2\pi}{M_g} \cdot (m-1). \quad (6)$$

In a linear formation, the gateways have the same orientation but linearly increasing separation relative to the first gateway. In contrast, a circular formation provides equal separation among the gateways but linearly increasing orientation relative to the first gateway.

Countermeasures Against MIMO Inter-Antenna Interference MIMO Channel Model and Capacity In free-space, the complex-valued baseband response between the mth transmit gateway and the nth satellite antenna is $$h_{m,n} = \frac{\lambda_u}{4\pi \cdot r_{m,n}} \cdot \exp\left(-j\frac{2\pi}{\lambda_u} \cdot r_{m,n}\right), \quad (7)$$

where $\lambda_u$ is the wavelength associated with the uplink carrier frequency and $r_{m,n}$ is the distance between the two elements. Assuming that the relative differences in path-loss are negligible, the normalized free-space channel response matrix for an $M_s \times M_g$ MIMO-enabled feeder link is $$H_{u,LoS}^{(n)} = \begin{bmatrix} e^{-j\frac{2\pi}{\lambda_u} r_{1,1}} & e^{-j\frac{2\pi}{\lambda_u} r_{1,2}} & \cdots & e^{-j\frac{2\pi}{\lambda_u} r_{1,M_g}} \\ e^{-j\frac{2\pi}{\lambda_u} r_{2,1}} & e^{-j\frac{2\pi}{\lambda_u} r_{2,2}} & \cdots & e^{-j\frac{2\pi}{\lambda_u} r_{2,M_g}} \\ \vdots & \vdots & \ddots & \vdots \\ e^{-j\frac{2\pi}{\lambda_u} r_{M_s,1}} & e^{-j\frac{2\pi}{\lambda_u} r_{M_s,2}} & \cdots & e^{-j\frac{2\pi}{\lambda_u} r_{M_s,M_g}} \end{bmatrix}. \quad (8)$$

In clear-sky conditions, the feeder uplink channel model may be made more complete to account for the radiation patterns of the satellite antennas, providing $\tilde{H}_u^{(n)}$ as $$\tilde{H}_u^{(n)} = J_u \odot H_{u,LoS}^{(n)}, \quad (9)$$

where $J_u$ has entries computed based on $$g_u(\theta_o) = \frac{1}{2} \cdot \frac{\lambda_u}{\pi D \cdot \sin(\theta_o)} \cdot J_1\left(\pi \frac{D}{\lambda_u} \cdot \sin(\theta_o)\right) + \quad (10)$$

$$36 \cdot \left(\frac{\lambda_u}{\pi D \cdot \sin(\theta_o)}\right)^o \cdot J_3\left(\pi \frac{D}{\lambda_u} \cdot \sin(\theta_o)\right).$$

In (10), $J_1(x)$ and $J_3(x)$ are the Bessel functions of the first and third order, respectively, $\theta_o$ represents the off-axis angle relative to boresight, and D is the diameter of the satellite antennas. The uplink signal vector as received by the satellite antennas, $\underline{y}_s^{(n)}$, is then $$\underline{y}_s^{(n)} = \tilde{H}_u^{(n)} \Lambda_u^{(n)} \cdot \underline{x}_g^{(n)} + \underline{w}_u^{(n)},$$

where $x_g^{(n)}$ is the vector of symbols transmitted by the gateways, $w_u^{(n)}$ is the additive white Gaussian noise (AWGN) uplink noise with variance $\sigma_u^2$, and $\Lambda_u^{(n)}$ is a diagonal matrix composed of the weather-induced attenuations, $\xi_{m_g}^{(n)}$, affecting the gateways, or $$\Lambda_u^{(n)} = \text{diag}\{\xi_1^{(n)}, \xi_2^{(n)}, \ldots, \xi_{M_g}^{(n)}\}, \tag{12}$$

derived from the attenuations $A_{m_g}^{(n)}$ in decibel (dB) as $A_{m_g}^{(n)} = -20 \cdot \log_{10}(|\xi_{m_g}^{(n)}|)$.

Based on the received uplink signal in (11), the time-invariant MIMO channel capacity is $$C_u^{(n)} = \log_2(\det(I_{M_o} + \rho_u^{(n)} \cdot \tilde{H}_u^{(n)} \Lambda_u^{(n)} (\tilde{H}_u^{(n)} \Lambda_u^{(n)})^H)), \tag{13}$$

where $\rho_u^{(n)}$ is the Carrier-to-Noise Ratio (CNR) on the uplink that includes the transmit power per gateway antenna.

Similar to (9), an $M_s \times M_g$ feeder downlink channel matrix, $\tilde{H}_d^{(n)}$ can be defined based on the downlink wavelength $\lambda_d$ and the radiation patterns of the downlink beams $J_d$ as $$\tilde{H}_d^{(n)} + H_{d,LoS}^{(n)} | J_d. \tag{14}$$

The corresponding downlink signal vector is $$y_g^{(n)} = \Lambda_d^{(n)} \tilde{H}_d^{(n)} \cdot x_g^{(n)} + w_d^{(n)}, \tag{15}$$

where $x_s^{(n)}$ is the vector of symbols transmitted by the satellite antennas and $w_d^{(n)}$ is the AWGN downlink noise with variance $\sigma_d^2$. Its associated MIMO channel capacity is given by $$C_d^{(n)} = \log_2(\det(I_{M_g} + \rho_d^{(n)} \cdot (\Lambda_d^{(n)} \tilde{H}_d^{(n)})^H \Lambda_d^{(n)} \tilde{H}_d^{(n)})), \tag{16}$$

where $\rho_d^{(n)}$ is the downlink CNR. In (16), a property is applied that $\det(I+AB) = \det(I+BA)$ if AB is complex conjugate symmetric.

A MIMO satellite channel can be improved by changing a gateway cluster geometry relative to the satellite antennas. In pure LoS MIMO conditions, explicit criteria in terms of the inter-antenna spacing are derived to ensure full spatial multiplexing gain.

Figure 2A:
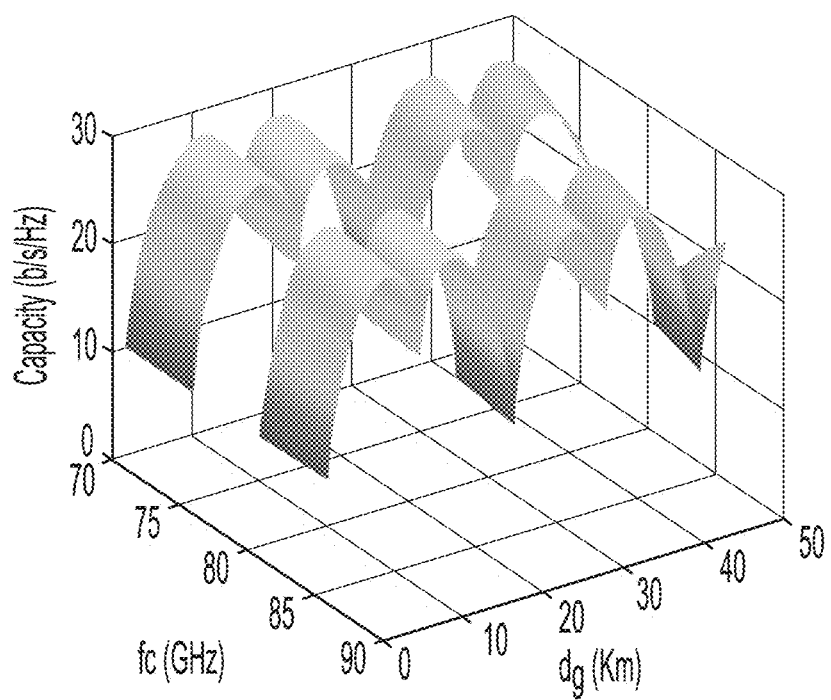
FIG. 2A illustrates a 3D capacity of 3×3 MIMO uplink and downlink feeder links in the E-band against a gateway separation when using a linear gateway formation according to various embodiments.

FIG. 2A illustrates a 3D capacity of 3×3 MIMO uplink and downlink feeder links in the E-band against a gateway separation when using a linear gateway formation according to various embodiments.

Figure 2B:
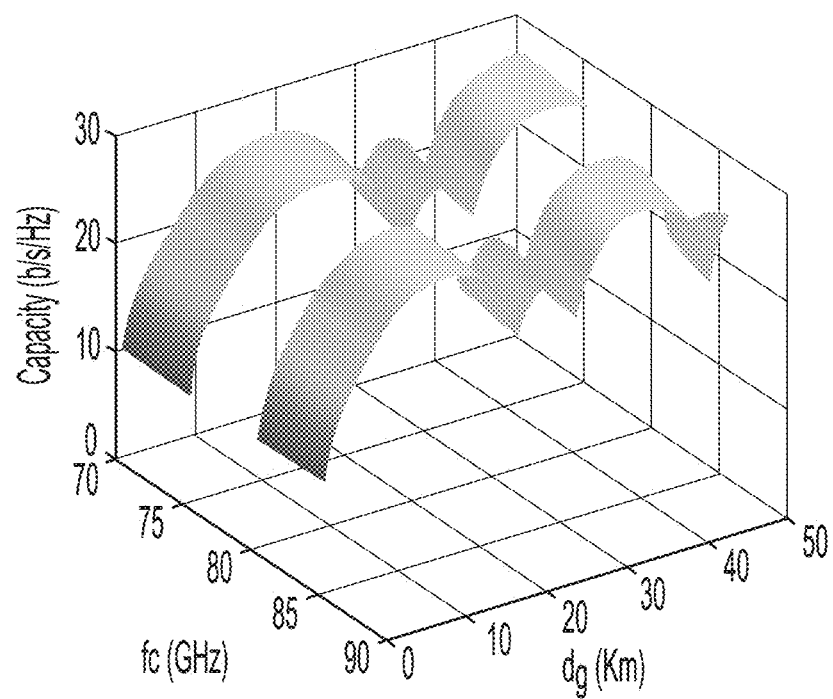
FIG. 2B illustrates a 3D capacity of 3×3 MIMO uplink and downlink feeder links in the E-band against a gateway separation when using a circular gateway formation according to various embodiments.

FIG. 2B illustrates a 3D capacity of 3×3 MIMO uplink and downlink feeder links in the E-band against a gateway separation when using a circular gateway formation according to various embodiments.

FIG. 2A and FIG. 2B illustrate exemplary 3D capacity plots of a 3×3 MIMO-enabled feeder link as it varies over the gateway separation when the carrier frequency ranges in 81-86 GHz for the uplink and 71-76 GHz for the downlink at a CNR of 24 dB. Selected geometric gateway positions can maximize the multiplexing gain in LoS conditions, resulting in achieving full-rank MIMO channel. For an inter-antenna spacing onboard the satellite of 6 m, greater channel capacity is achieved when the inter-gateway distance is about 17 km and 43 km for the linear and circular formations, respectively. Larger optimal gateway separation is more advantageous in terms of decorrelating the rainfall events as it is less likely that more than two gateways separated by large distances will experience deep rain attenuations simultaneously.

Pre-Interference and Post-Interference Processing

Figure 3:
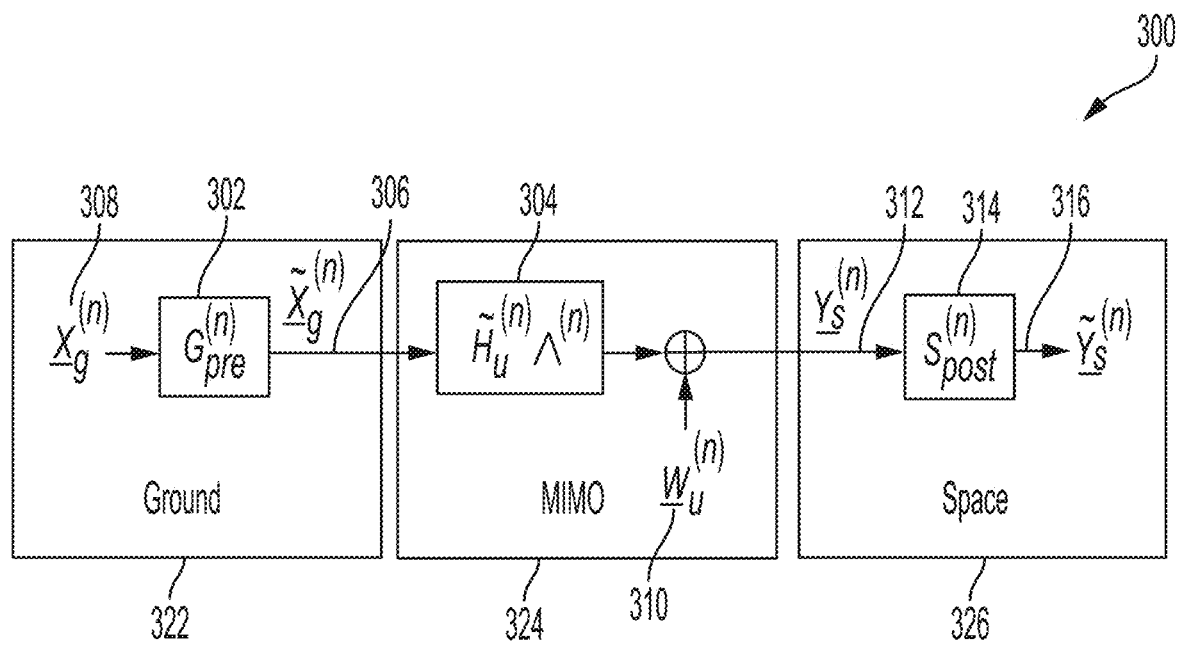
FIG. 3 illustrates countermeasures for MIMO feeder uplinks according to various embodiments.

FIG. 3 illustrates countermeasures for MIMO feeder uplinks according to various embodiments.

Countermeasures 300 against inter-antenna interference for MIMO-enabled feeder links in the uplink direction may take the form of pre-interference signal processing 302 ($G_{pre}^{(n)}$) and post-interference processing 314 ($S_{post}^{(n)}$). Pre-interference signal processing 302 may be implemented on the ground 322 and may maximize spatial multiplexing afforded by MIMO 324 for a normal weather, for example, a clear sky. This is done by performing a linear combination of the gateway transmissions 308 ($x_g^{(n)}$), at a data processor through multiplication by pre-interference signal processing 302 ($G_{pre}^{(n)}$) to provide a modified transmitted vector 306 ( $\tilde{x}_g^{(n)}$), as $$\tilde{x}_g^{(n)} = G_{pre}^{(n)} \cdot x_g^{(n)}. \tag{17}$$

A normalization of pre-interference signal processing 302 ($G_{pre}^{(n)}$) may be used to ensure that the maximum power $P_u^{(n)}$ at each gateway is not exceeded. A post-interference processing 314 may remove the spatial interaction 304 among the satellite receive antennas 326 induced as a received signal 312 ($y_s^{(n)}$) experiences different weather conditions 310 ($w_u^{(n)}$). In some embodiments, a linear combination of the received signals onboard the satellite through multiplication by the post-interference processing 314 ($S_{post}^{(n)}$) is performed to provide a modified received vector 316 ($\tilde{y}_s^{(n)}$)

$$\tilde{y}_s^{(n)} = S_{post}^{(n)} \cdot y_s^{(n)}. \tag{18}$$

In some embodiments, the pre-interference signal processing 302 ($G_{pre}^{(n)}$) based on a peak-power constraint is $$G_{pre}^{(n)} = \sqrt{P_u^{(n)}} \cdot V_u^{(n)} Q, \tag{19}$$

where $V_u^{(n)}$ is the matrix containing as columns the eigenvectors associated with $(\tilde{H}_u^{(n)})^H \tilde{H}_u^{(n)}$ and Q is the unitary discrete Fourier transform (DFT) matrix. The post-interference matrix may be derived under the zero-forcing (ZF) condition as the left-inverse of a cascade of matrices, or $$S_{post}^{(n)} = \left(\tilde{H}_u^{(n)} A^{(n)} G_{pre}^{(n)}\right)^{-1}_{left} \tag{20}$$
$$= \left((G_{pre}^{(n)})^H A^{(n)} (\tilde{H}_u^{(n)})^H \tilde{H}_u^{(n)} A^{(n)} G_{pre}^{(n)}\right)^{-1} \cdot \left(\tilde{H}_u^{(n)} A^{(n)} G_{pre}^{(n)}\right)^H.$$

The associated uplink signal-to-interference-and-noise ratio (SINR) is the same across $m_g$ and is computed as $$SINR_{u,m_g}^{(n)} = SINR_{u,clear}^{(n)} \cdot \left(\frac{1}{M_g} \sum_{i=1}^{M_g} 10^{(A_i^{(n)}/10)}\right)^{-1} \tag{21}$$

where $SINR_{u,clear}^{(n)}$ is the uplink SINR obtained under clear sky.

In some embodiments, useful in heavy precipitation, only post-interference processing is used which offers different SINR performance depending on rain attenuation $A_{m_g}^{(n)}$ that is affecting any individual gateway. A scaled identity matrix may be selected for pre-interference processing, $G_{pre}^{(n)} = \sqrt{P_u^{(n)}} \cdot I_{M_g}$ in (17) and (20). The associated SINR performance for implementing post-interference processing alone is $$SINR_{u,m_g}^{(n)} = SINR_{u,clear,m_g}^{(n)} \cdot 10^{(-A_{m_g}^{(n)}/10)}, \tag{22}$$

where $SINR_{u,clear,m_g}^{(n)}$ is the uplink SINR in clear sky associated with the $m_g$th gateway, possibly different under the post-processing solution, for $m_g = 1, 2, \ldots, M_g$.

The achievable sum-rate for a given MIMO feeder link can then be determined for Gaussian symbols as $$\mathcal{R}^{(n)} = \sum_{m_g=1}^{M_g} \log_2\left(1 + SINR_{u,m_g}^{(n)}\right) \quad (23)$$

Countermeasures 300 based on ZF criterion are expected to achieve near-capacity performance as the noise levels are low on the feeder-link side. In some embodiments, countermeasures 300 may be based on, for example, minimum mean-square error (MMSE) or regularized ZF (RZF) to reduce amplification of noise components.

Figure 4:
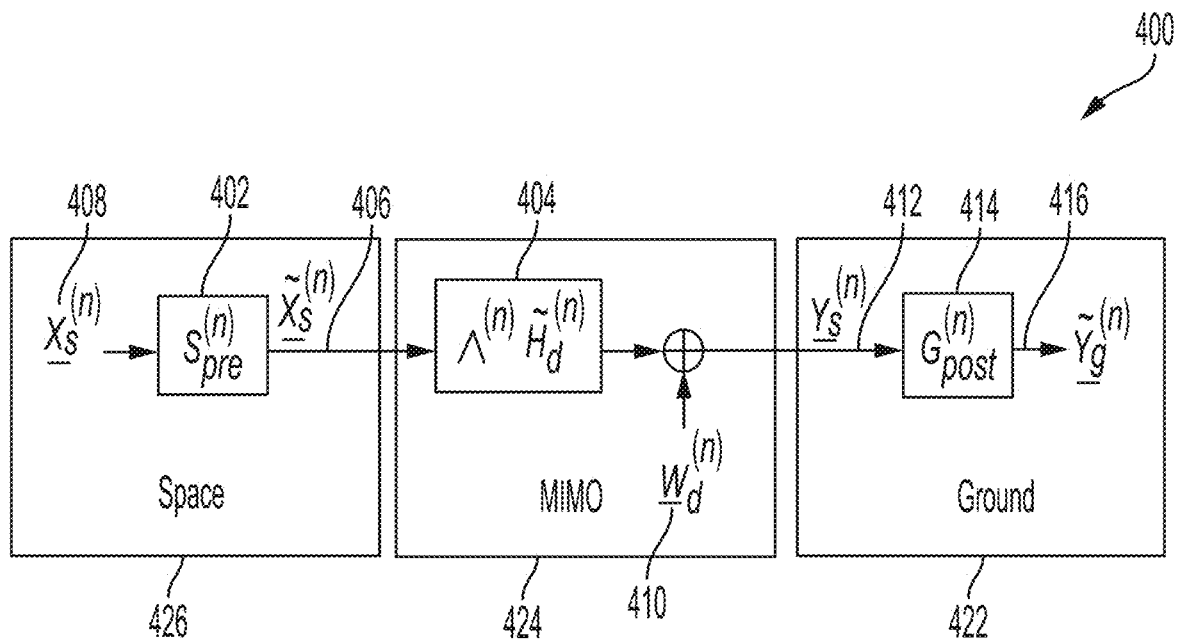
FIG. 4 illustrates countermeasures for MIMO feeder downlinks according to various embodiments.

FIG. 4 illustrates countermeasures for MIMO feeder downlinks according to various embodiments.

Similarly on the downlink, countermeasures 400 against inter-antenna interference for MIMO-enabled feeder links includes pre-interference processing 402 ($S_{pre}^{(n)}$) and post-interference signal processing 414 ($G_{post}^{(n)}$). Pre-interference processing 402 is implemented to maximize spatial multiplexing afforded by MIMO in clear sky. A linear combination of the satellite transmissions through multiplication by pre-interference processing 402 ($S_{pre}^{(n)}$) to provide a modified transmitted vector 406 ($\tilde{x}_s^{(n)}$) as $$\tilde{x}_g^{(n)} = S_{pre}^{(n)} \cdot x_g^{(n)}. \quad (24)$$

The post-interference processing 414 removes the inter-antenna interference 404 among the receiving gateways induced as the gateways experience different weather conditions 410 ($w_d^{(n)}$). A linear combination of the received gateway transmissions at the data processor through multiplication by $G_{post}^{(n)}$ provides a modified received vector 416 ($\tilde{y}_g^{(n)}$), as $$\tilde{y}_g^{(n)} = G_{post}^{(n)} \cdot y_g^{(n)}. \quad (25)$$

The downlink counterpart to the pre-interference and post-interference processing in (19) and (20) are $$S_{pre}^{(n)} = \sqrt{P_d^{(n)}} \cdot V_d^{(n)} Q \quad (26)$$

$$G_{post}^{(n)} = (\Lambda_d^{(n)} \bar{H}_d^{(n)} S_{pre}^{(n)})_{left}^{-1} \quad (27)$$

Smart Gateway Diversity Using Multiple MIMO Feeder Links

A smart gateway diversity configuration in which P diversity MIMO links are added per N primary ones for redundancy. A beam is served by one gateway and its traffic is switched over to a diversity gateway when experiencing heavy rainfall. For a beam to go into outage, the beam's gateway is placed in outage when the P diversity sites are unavailable. The following table summarizes when ground interference processing, satellite interference processing or a combination thereof may be used depending on a link's direction (gateway to satellite (uplink) or satellite to gateway (downlink)) and rain fade conditions.

| | Ground | Satellite |
|---|---|---|
| Uplink-clear sky | Y | N |
| Downlink-clear sky | Y | N |
| Uplink-SINR < acceptable SINR loss threshold | Y | Y |
| Downlink-SINR < acceptable SINR loss threshold | Y | Y |
| Uplink-precipitation > precipitation-induced outage limit | N | Y |
| Downlink-precipitation > precipitation-induced outage limit | Y | N |

The system may include weather-related parameters. An acceptable precipitation-loss limit may be a threshold where precipitation and the rain fade thus induced are negligible and the gateways in a cluster operate in a default mode, for example, only post-processing mode. The acceptable precipitation may be expressed as an acceptable SINR loss threshold between the gateway and the satellite. For example, a loss of 3 dB or less may be treated as negligible or tolerable and the system may continue to operate as if the LoS is a clear sky. However, losses greater than the threshold may be used to trigger processing by the satellite interference processor for the affected LoS signaling. The satellite interference processor may generally be a pass-through to conserve satellite resources such as available power.

A precipitation-induced outage limit may be a threshold where precipitation and the rain fade thus induced are so excessive that, for a cluster, replacing the weather-affected gateway with an available diversity gateway is advisable. When a gateway experiences precipitation between the acceptable precipitation-loss limit and the precipitation-induced outage limit, countermeasures for the affected gateway may include pre- and post-interference processing.

Numerical Studies

Results from extensive performance evaluations demonstrate the weather-resiliency of the various countermeasures for feeder links that utilize LoS MIMO under linear and circular gateway formations. The evaluation assumes a GEO satellite in an equatorial slot with longitude $\theta_s$ of 97° W and orbital radius $R_s$ of 42,164 km. The GEO satellite's reflector antennas each have a diameter D of 2 meters and uniform spacing $d_s$ of 6 meters. The frequency band considered is in the V/E band. A received CNR of 24 dB is used in clear sky. Two weather regions for the gateway clusters are evaluated with locations in Nevada and Montana, USA.

Figure 5A:
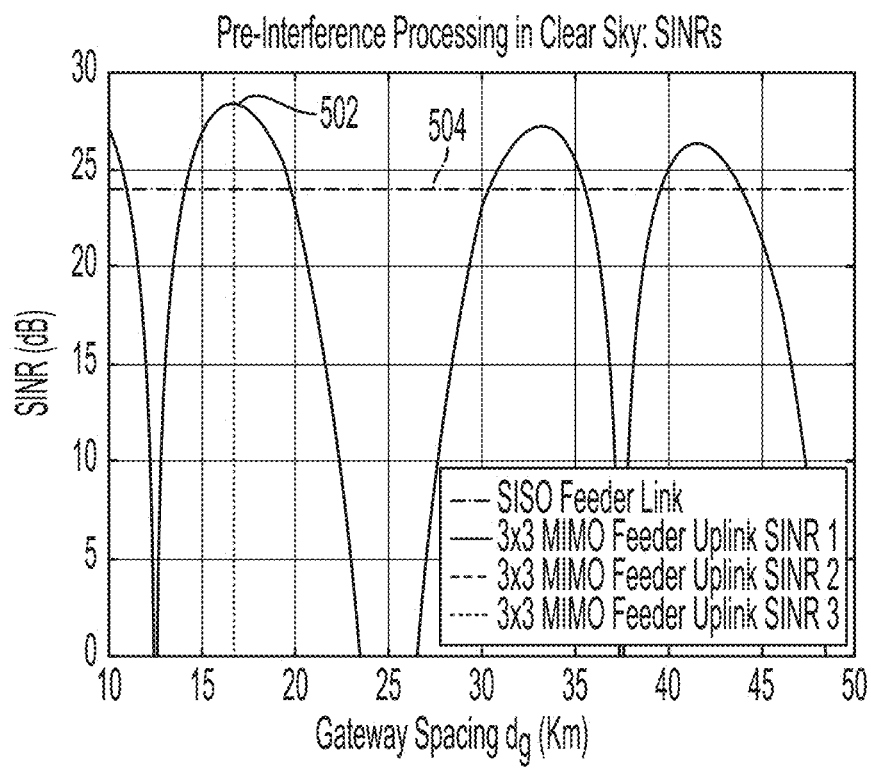
FIG. 5A, FIG. 5B and FIG. 5C illustrate Uplink SINR performance of a 3×3 MIMO feeder link with a linear gateway formation when using pre-interference processing, post-interference processing, and pre- and post-interference processing, respectively, according to some embodiments.
Figure 5B:
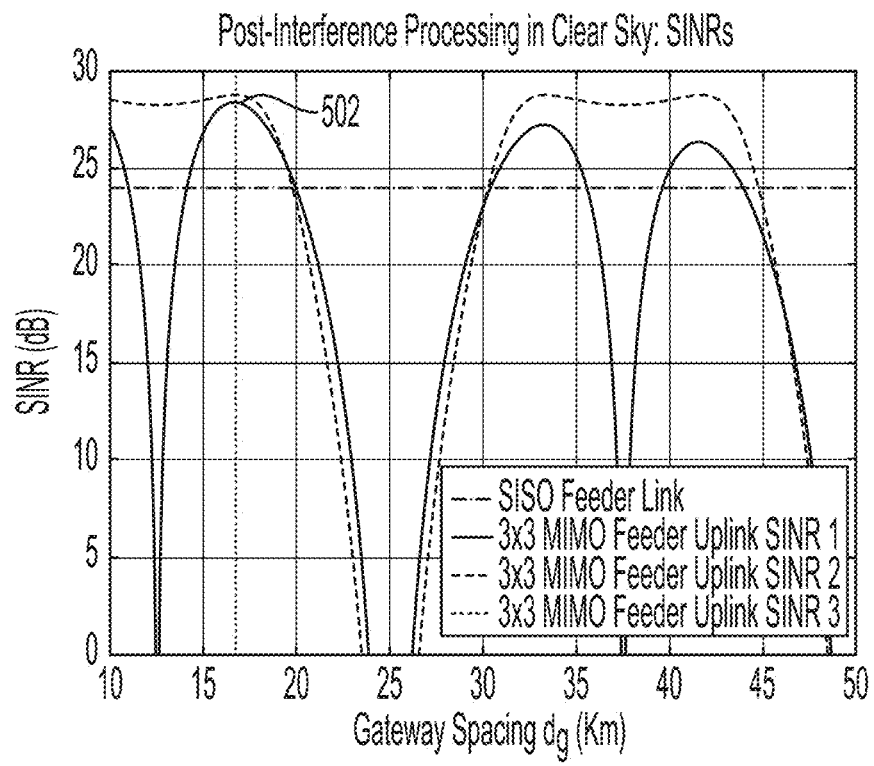
Figure 5C:
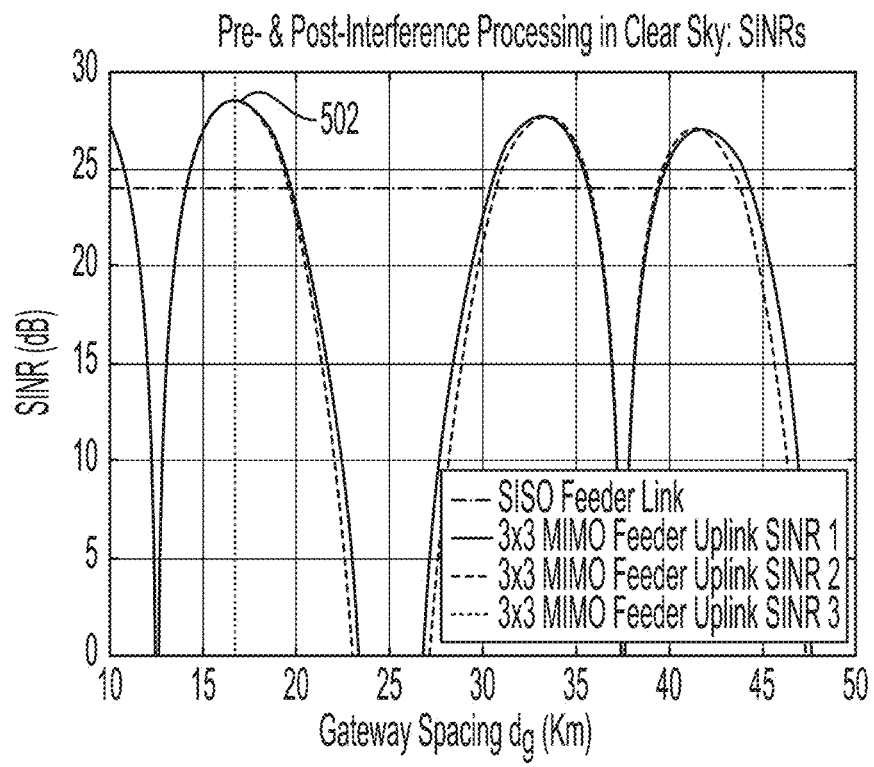

FIG. 5A, FIG. 5B and FIG. 5C illustrate uplink SINR performance of a 3×3 MIMO feeder link with a linear gateway formation when using pre-interference processing, post-interference processing, and pre- and post-interference processing, respectively, according to some embodiments.

FIG. 5A, FIG. 5B and FIG. 5C display performance in terms of SINR for each of the receive antennas in a 3×3 MIMO linear configuration, located in Nevada and using a carrier frequency of 80 GHz, as it varies with gateway separation under clear-sky conditions. Performance is dependent on the inter-gateway separation, with a peak performance 502 achieved with a uniform spacing between the gateways of 17 km. Similar performances can be achieved by applying linear combination on the transmit side (FIG. 5A) or at the receive side (FIG. 5B) or by applying linear combination on both the transmit and receive sides (FIG. 5C). As such, ground-based processing may be sufficient, relieving the computational burden of satellite onboard processing. Post-interference processing only solution of FIG. 5B reveals differences between the performances as the second gateway is at the boresight whereas the others are not depending on the separation. In comparison to SINR 504 for SISO solutions, about 4.7 dB additional benefit is extracted when using 3×3 MIMO configuration.

Figure 6A:
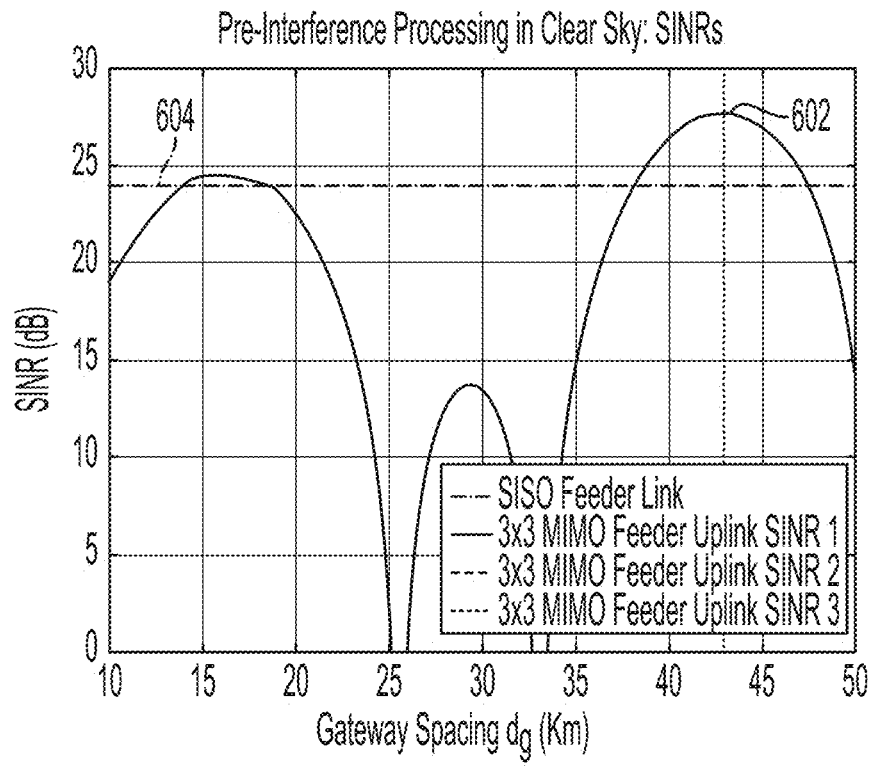
FIG. 6A, FIG. 6B and FIG. 6C illustrate Uplink SINR performance of a 3×3 MIMO feeder link with a circular gateway formation when using pre-interference processing, post-interference processing, and pre- and post-interference processing, respectively, according to some embodiments.
Figure 6B:
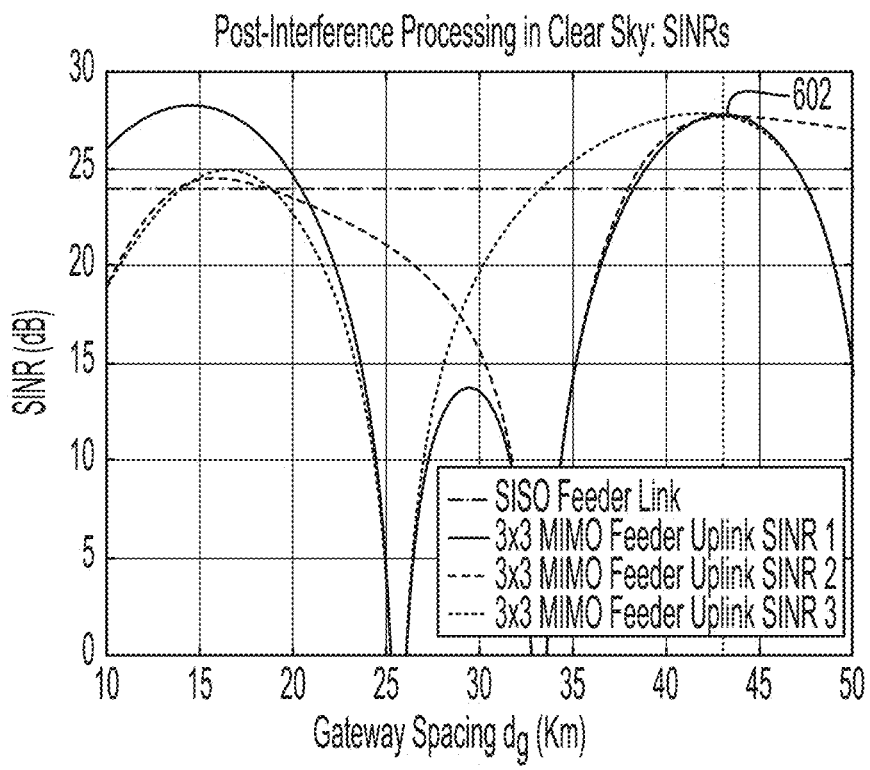
Figure 6C:
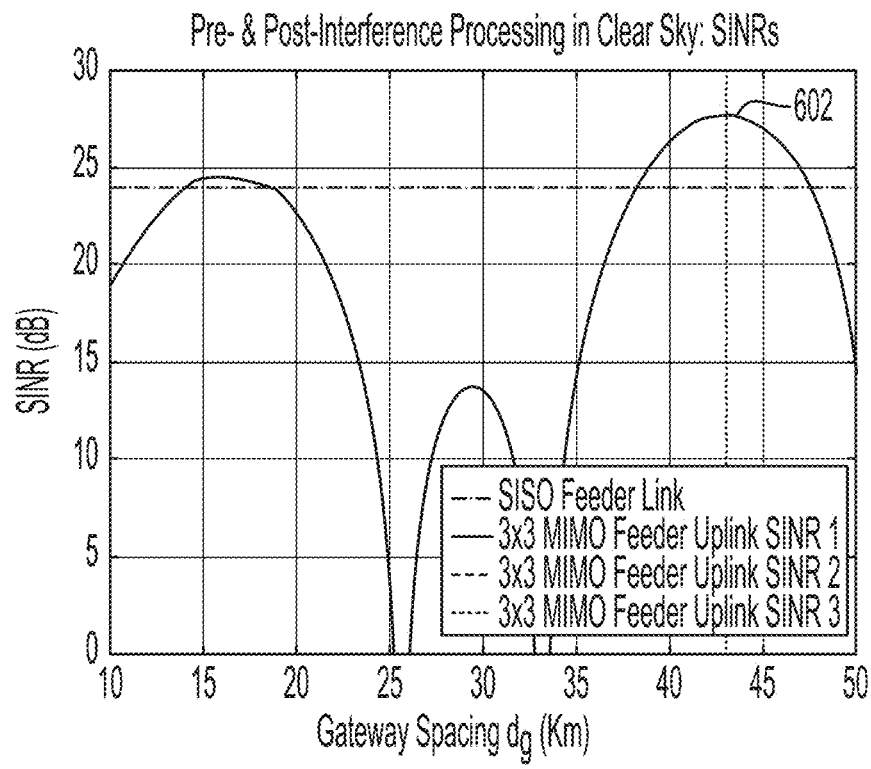

FIG. 6A, FIG. 6B and FIG. 6C illustrate uplink SINR performance of a 3×3 MIMO feeder link with a circular gateway formation when using pre-interference processing, post-interference processing, and pre- and post-interference processing, respectively, according to some embodiments.

FIG. 6A, FIG. 6B and FIG. 6C show performance in terms of SINR for each of the receive antennas in a 3×3 MIMO circular configuration, located in Nevada and using a carrier frequency of 80 GHz, as it varies with gateway separation under clear-sky conditions. Performance is dependent on the inter-gateway separation, with a peak performance 602 achieved with a uniform spacing between the gateways of 43 km. Under a circular formation, all the gateways experience the same normalized loss due to antenna patterns. In comparison to SINR 604 for SISO solutions, about 4.5 dB additional benefit is extracted when using 3×3 MIMO configuration.

Figure 7A:
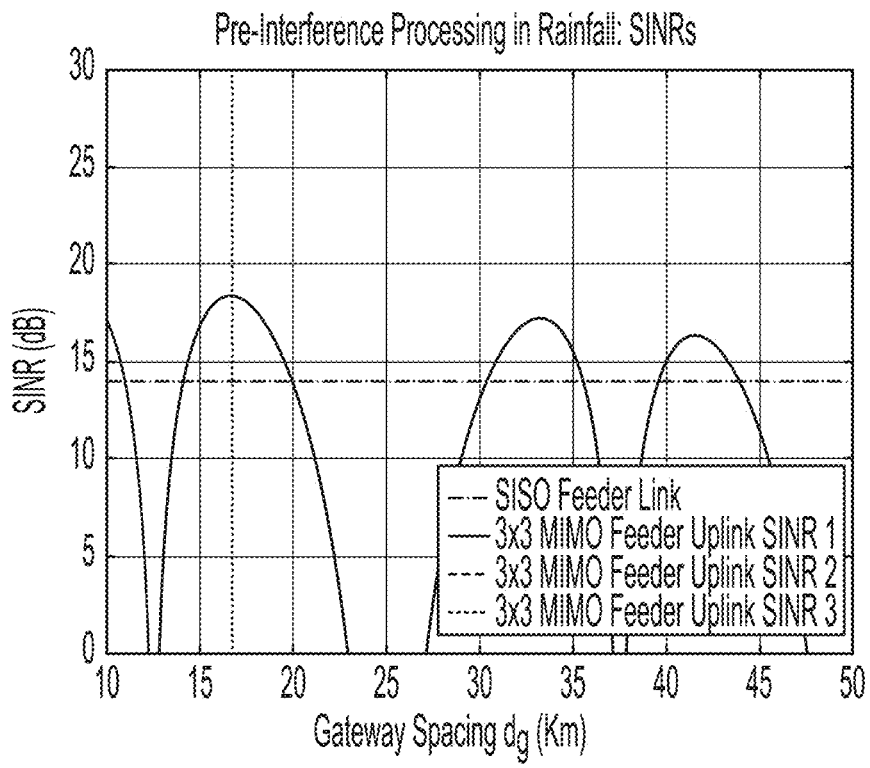
FIG. 7A, FIG. 7B and FIG. 7C illustrate Uplink SINR performance of a 3×3 MIMO feeder link with a linear gateway formation when the third gateway experiences a 10-dB rain attenuation and using pre-interference processing, post-interference processing, and pre- and post-interference processing, respectively, according to some embodiments.
Figure 7B:
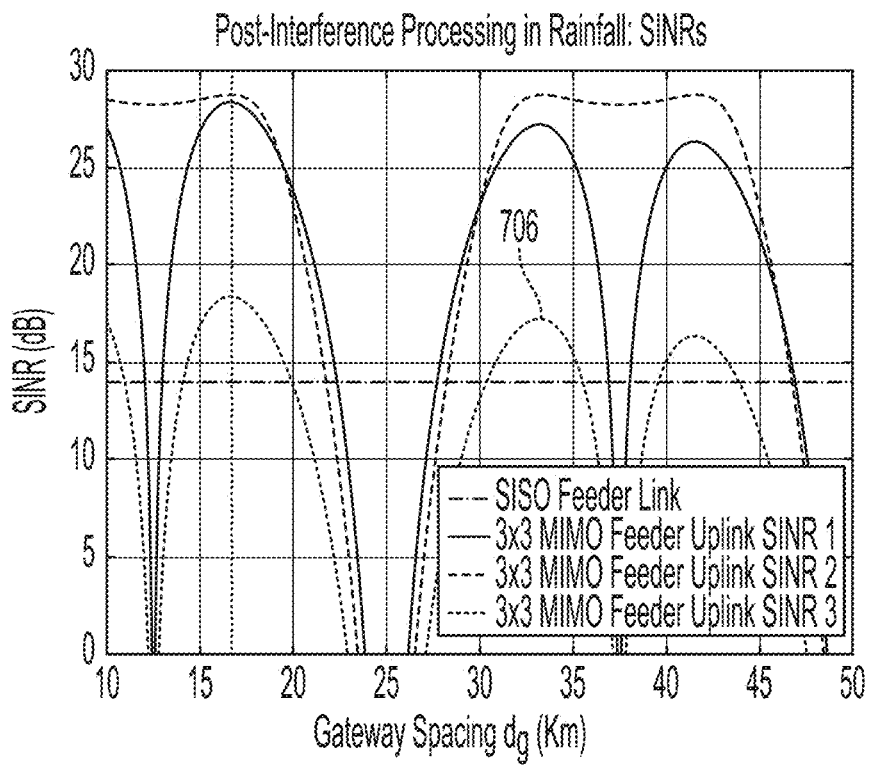
Figure 7C:
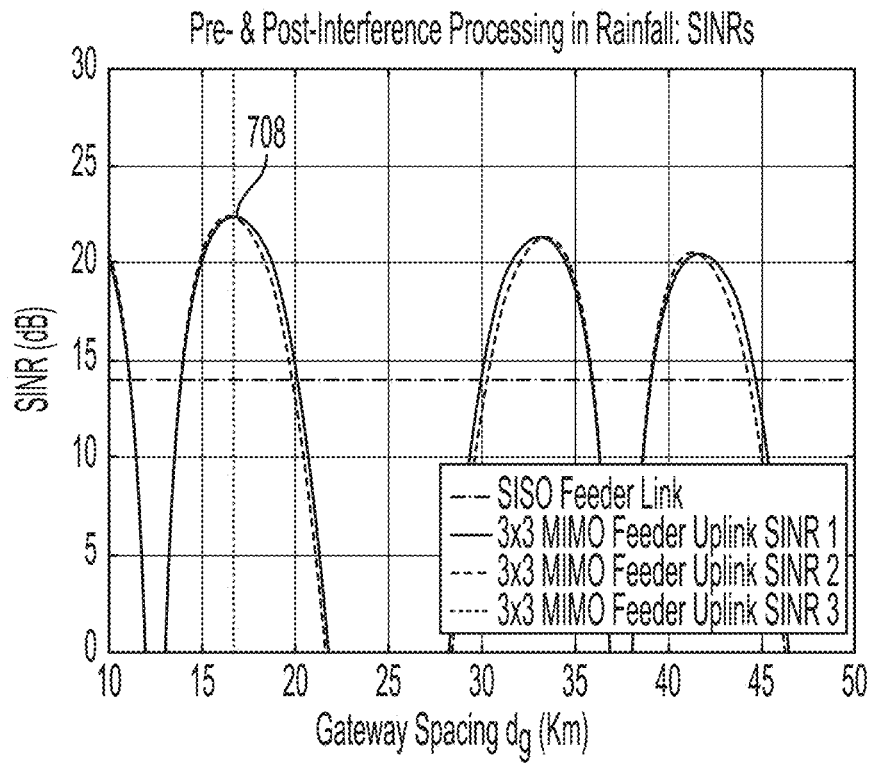

FIG. 7A, FIG. 7B and FIG. 7C illustrate uplink SINR performance of a 3×3 MIMO feeder link with a linear gateway formation when the third gateway experiences a 10-dB rain attenuation and using pre-interference processing, post-interference processing, and pre- and post-interference processing, respectively, according to some embodiments.

FIG. 7A, FIG. 7B and FIG. 7C illustrate the impact on SINR performance when a 10-dB rain attenuation affects the third gateway. At a separation of 17 km, using the post-interference processing solution in FIG. 7B offers a degraded performance only for the attenuated gateway, suffering from a 10-dB loss 706. This confirms the SINR loss anticipated analytically by (22). For the pre- and post-interference processing solution in FIG. 7C, the performance is uniform across the gateways with a loss of 6 dB 708, offering an additional margin to rain of 4 dB. This is consistent with the SINR loss anticipated analytically by (21) when combining pre-interference and post-interference processing.

Figure 8A:
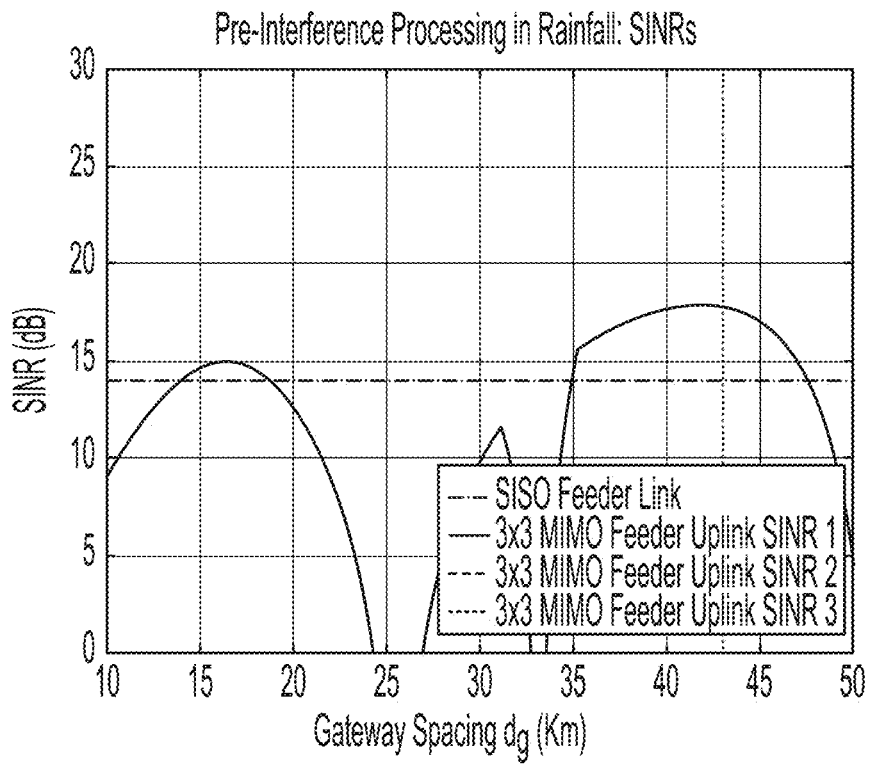
FIG. 8A, FIG. 8B and FIG. 8C illustrate Uplink SINR performance of a 3×3 MIMO feeder link with a circular gateway formation when the third gateway experiences a 10-dB rain attenuation and using pre-interference processing, post-interference processing, and pre- and post-interference processing, respectively, according to some embodiments.
Figure 8B:
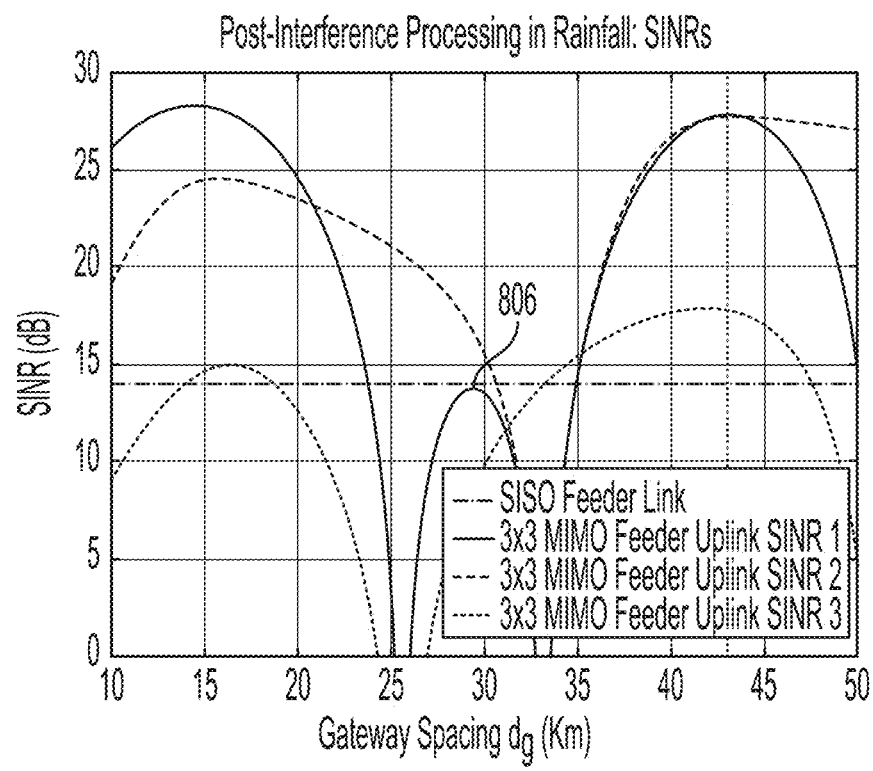
Figure 8C:
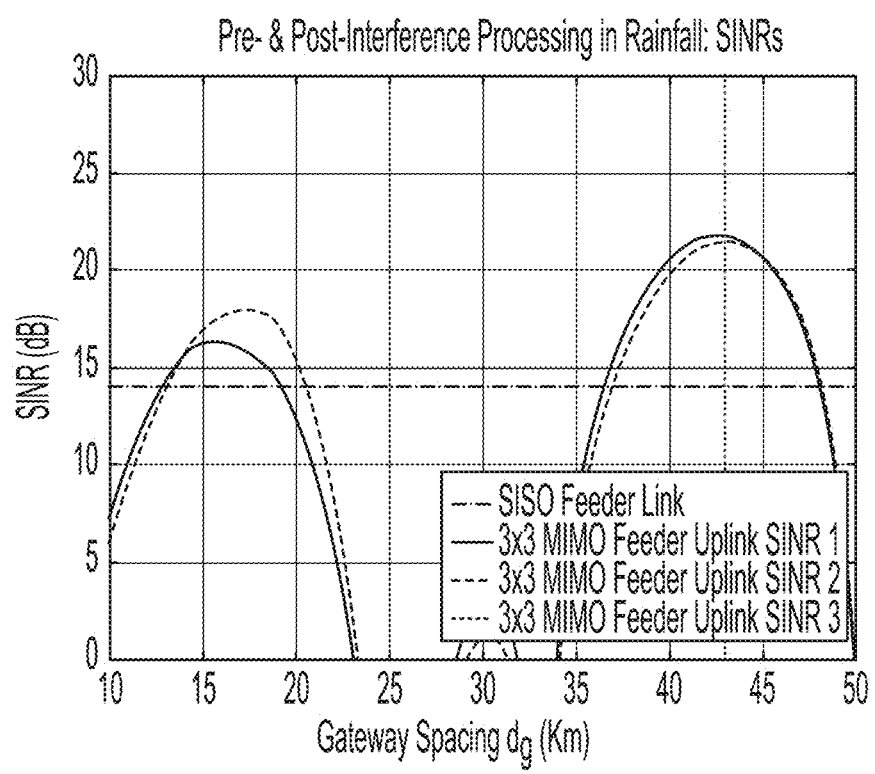

FIG. 8A, FIG. 8B and FIG. 8C illustrate Uplink SINR performance of a 3×3 MIMO feeder link with a circular gateway formation when the third gateway experiences a 10-dB rain attenuation and using pre-interference processing, post-interference processing, and pre- and post-interference processing, respectively, according to some embodiments.

FIG. 8A, FIG. 8B and FIG. 8C illustrate uplink SINR performance of a 3×3 MIMO feeder link deploying circular formation when the third gateway experiences a 10-dB rain attenuation. At a spacing of 43 km, the loss in SINR 806 when adopting post-interference processing is present for the affected gateway only, suffering from 10 dB degradation. For the pre- and post-interference processing solution in FIG. 8C, the same performance is achieved across the gateways, offering 4 dB additional margin to rain through their cooperation. The SINR loss of 10 dB for the affected gateway when using post-interference processing and the 6-dB loss uniformly measured across gateways when combined with pre-interference processing corroborate the SINR expressions (22) and (21), respectively.

Figure 9A:
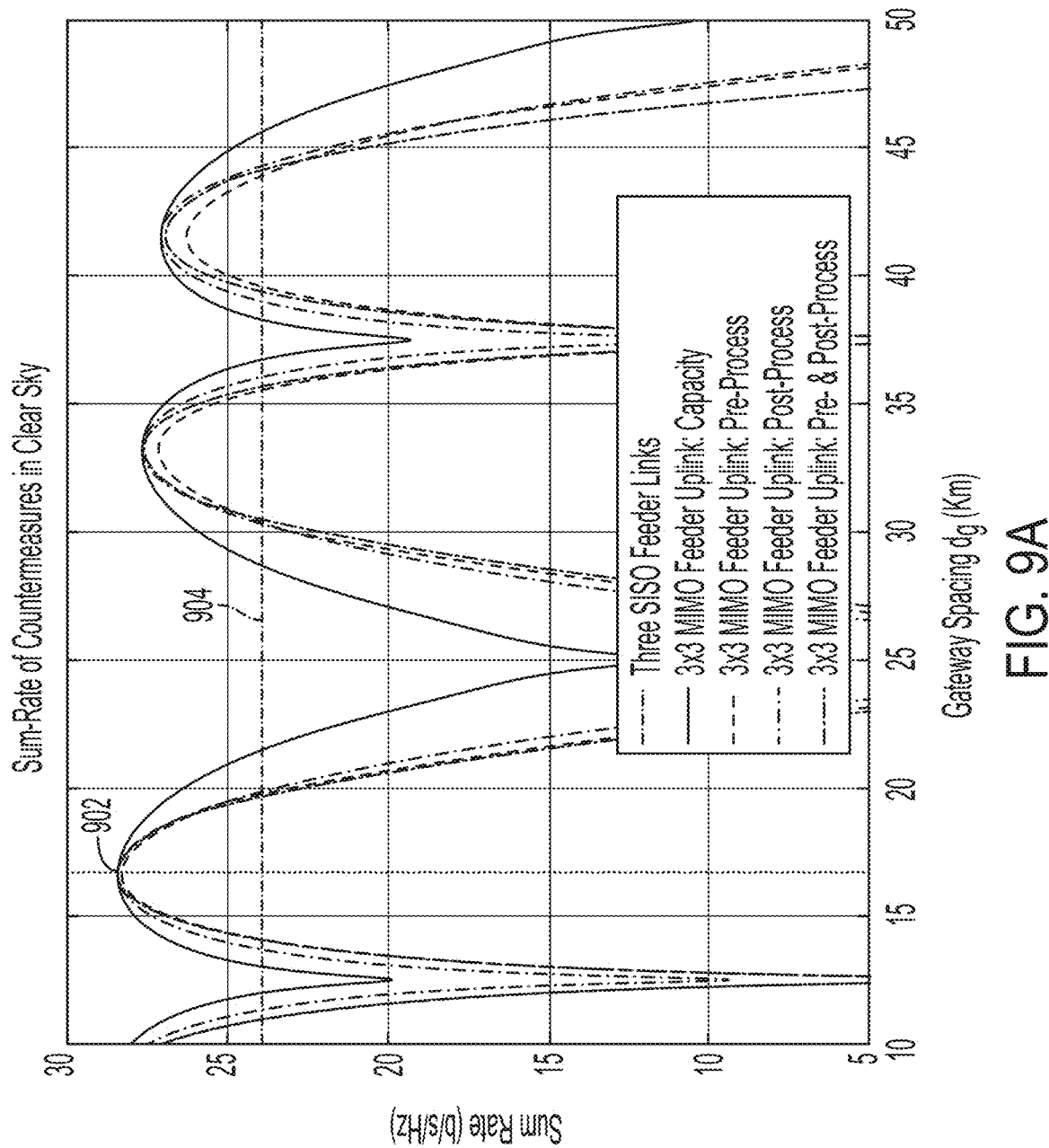
FIG. 9A and FIG. 9B illustrate Uplink sum-rate performance of 3×3 MIMO feeder link in clear sky when using a linear and circular gateway formation, respectively, according to some embodiments.
Figure 9B:
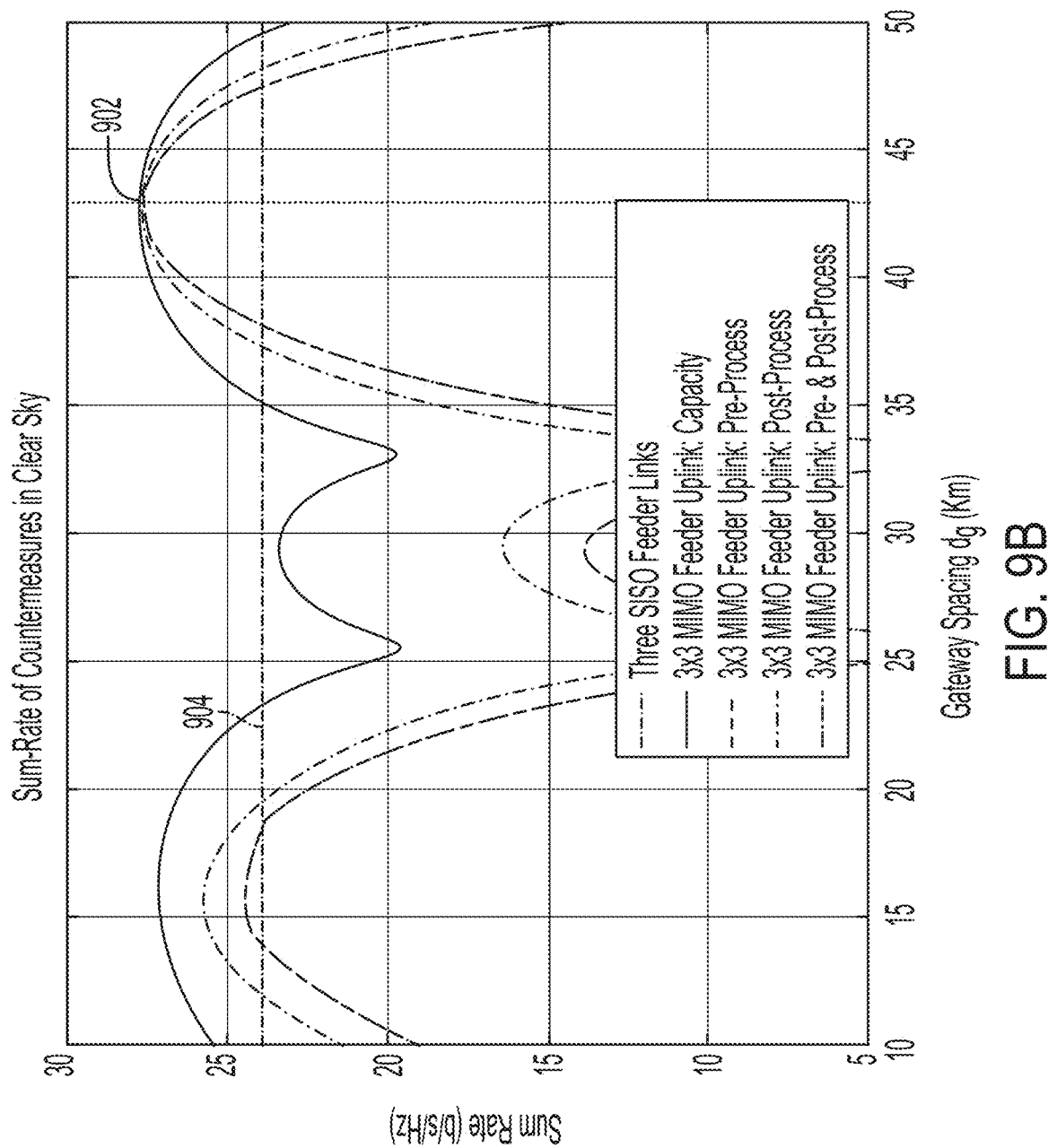

FIG. 9A and FIG. 9B illustrate uplink sum-rate performance of 3×3 MIMO feeder link in clear sky when using a linear and circular gateway formation, respectively, according to some embodiments.

FIG. 9A and FIG. 9B illustrate a comparison between the sum-rate achieved by the different countermeasures and the theoretical capacity bound under clear-sky conditions for a carrier frequency of 80 GHz. As can be seen in FIG. 9A and FIG. 9B, the capacity bound is maximized at certain inter-gateway separations relative to inter-antenna spacing onboard the satellite. Also, the maximum capacity is approached by either pre-interference (FIG. 9A) or post-interference (FIG. 9B) processing with separations of 17 km and 43 km for the linear and circular formations, respectively. Also, it is shown that capacity 902 of a 3×3 MIMO feeder link exceeds the sum rate capacity 904 of three SISO feeder links by about 20%, suggesting that full degrees of freedom, in this case three, is achieved at the optimal inter-gateway separations.

Figure 10A:
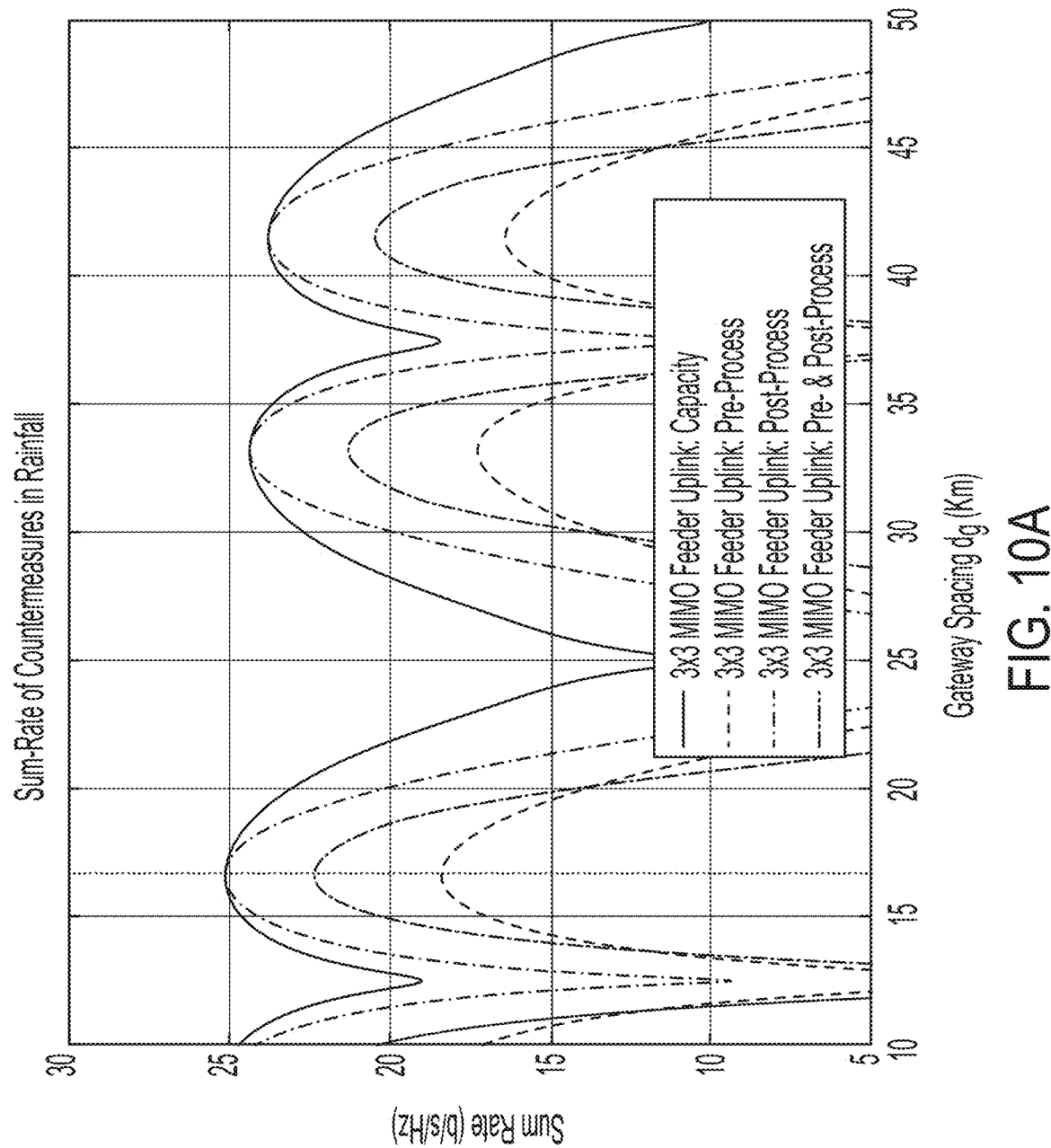
FIG. 10A and FIG. 10B illustrate Uplink sum-rate performance of 3×3 MIMO feeder link when the third gateway experiences a 10-dB rain attenuation and using a linear and circular gateway formation, respectively, according to some embodiments.
Figure 10B:
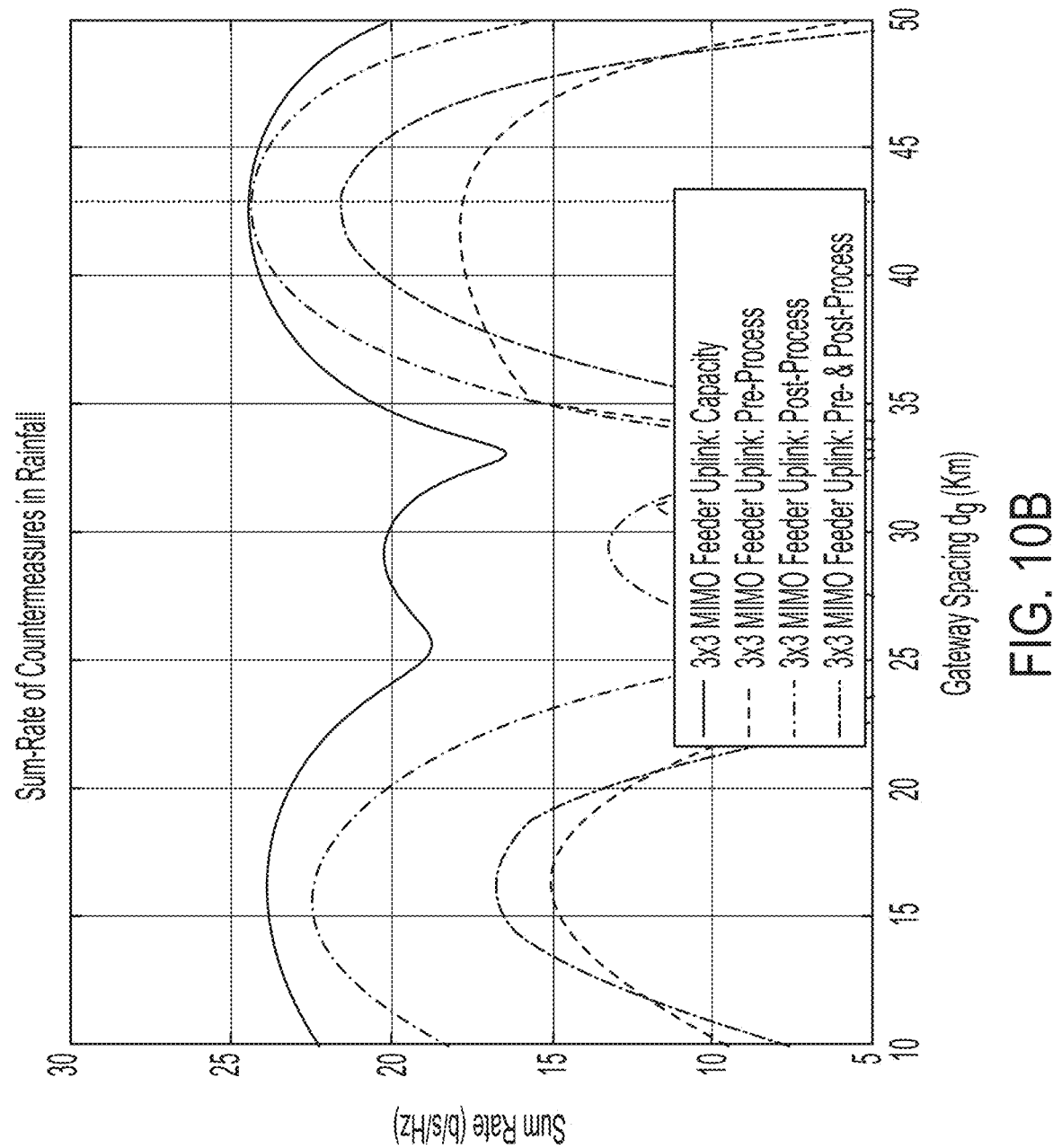

FIG. 10A and FIG. 10B illustrate uplink sum-rate performance of 3×3 MIMO feeder link when the third gateway experiences a 10-dB rain attenuation and using a linear and circular gateway formation, respectively, according to some embodiments.

FIG. 10 provides a comparison between the sum-rate achieved by the different countermeasures and the theoretical capacity bound when the third gateway experiences a 10-dB rain attenuation. The sum-rate is the capacity of two uplinks using the same resources of time, carrier, orthogonality. In this case, the performance in terms of sum-rate at the optimal separation is different when adopting different countermeasures. The theoretical capacity bound is approached by the post-interference processing as its performance degrades only for the gateway affected by the rain attenuation. When combined with pre-interference processing, the performance is uniform across the gateways, enforcing fairness, and is better relative to that of pre-interference processing alone.

Figure 11A:
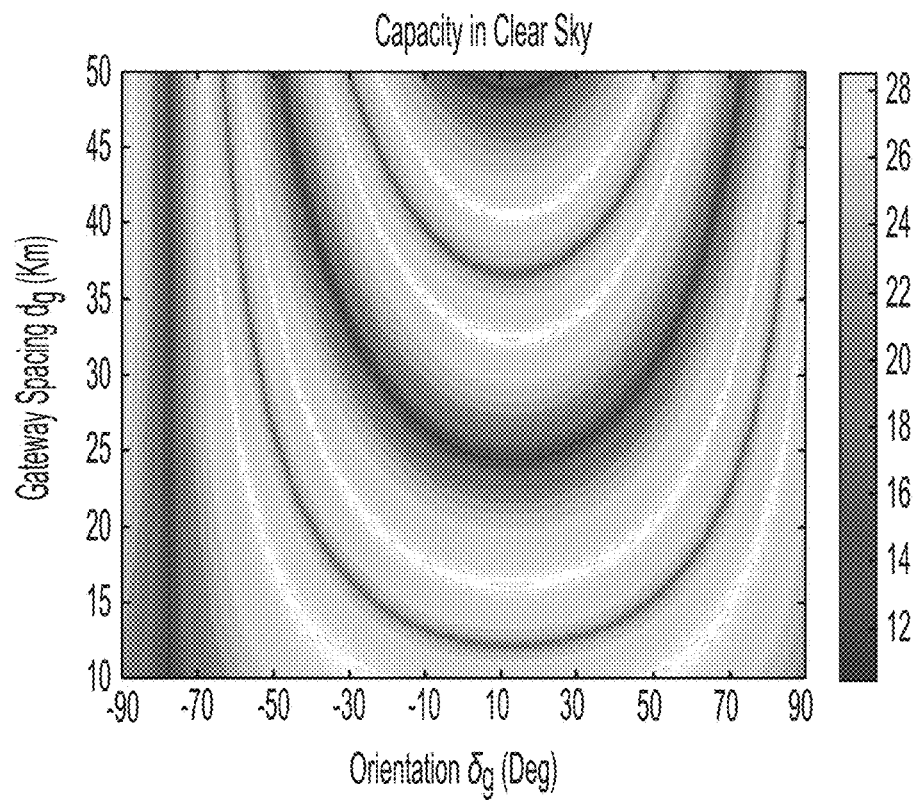
FIG. 11A and FIG. 11B illustrate capacity of 3×3 MIMO feeder link as it varies against inter-gateway separation and orientation when using a linear and circular gateway formation, respectively, according to some embodiments.
Figure 11B:
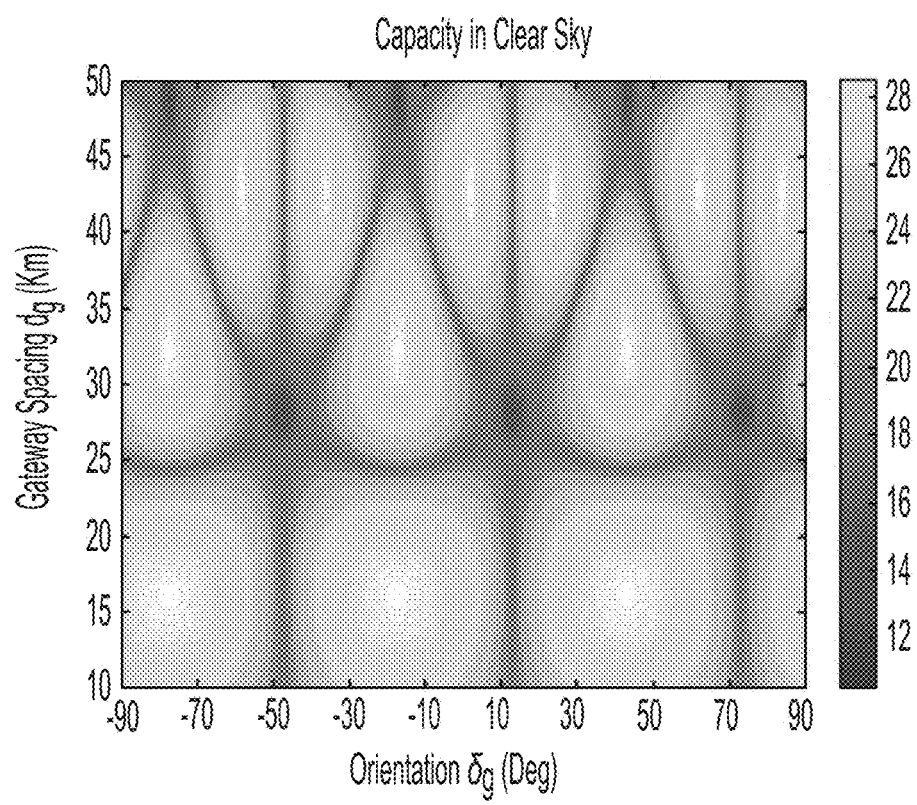

FIG. 11A and FIG. 11B illustrate capacity of 3×3 MIMO feeder link as it varies against inter-gateway separation and orientation when using a linear and circular gateway formation, respectively, according to some embodiments.

FIG. 11A and FIG. 11B illustrate a comparison between the linear and circular formations of a 3×3 MIMO feeder link in terms of the orientation parameter $\delta_g^{(n)}$ at carrier frequency of 80 GHz. As suggested by the figure, over a wide range of orientations [−90°, 90°], the linear formation offers only one optimal set of inter-gateway separation and orientation, with a minimum capacity observed when gateways are perpendicular to the line connecting the satellite antennas. In contrast, the circular formation offers four possible optimal locations over the same range of orientations, providing more flexibility in locating optimal gateway installation sites.

Figure 12:
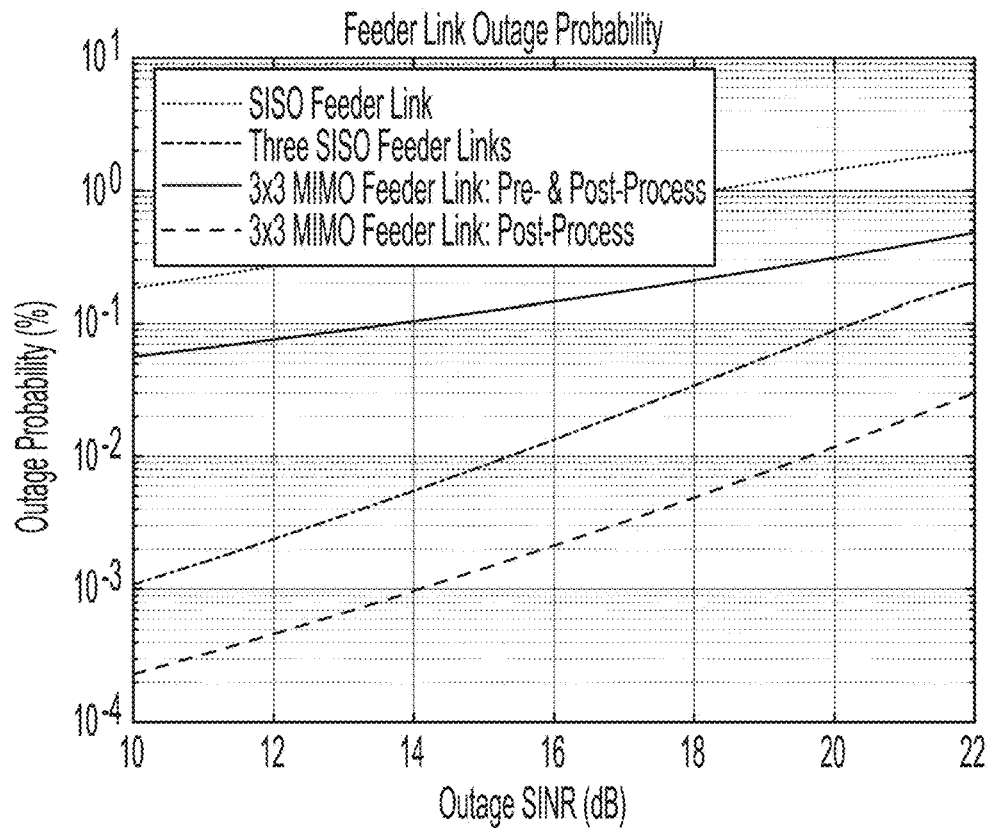
FIG. 12 illustrates outage probability comparison of 3×3 MIMO with SISO feeder links, according to some embodiments.

FIG. 12 illustrates outage probability comparison of 3×3 MIMO with SISO feeder links, according to some embodiments.

FIG. 12 documents the outage probability computation when using pre-interference and post-interference processing for a 3×3 MIMO feeder link with equal separation of 43 km. The long-term rain attenuation statistics used are those of Montana. A comparison with state-of-the-art SISO is also provided. Compared with its SISO counterpart, a target outage probability of 0.2% can be achieved by a 3×3 MIMO feeder link with an additional margin of 7.2 dB when benefiting from deploying pre-interference and post-interference processing. Also shown in the figure is the outage probability associated with the countermeasure that uses only post-interference processing, computed based on three individual gateways going into outage. At a target of 0.02%, a 3×3 MIMO feeder link provides an additional rain attenuation margin of 4.2 dB relative to three traditional SISO feeder links.

Figure 13:
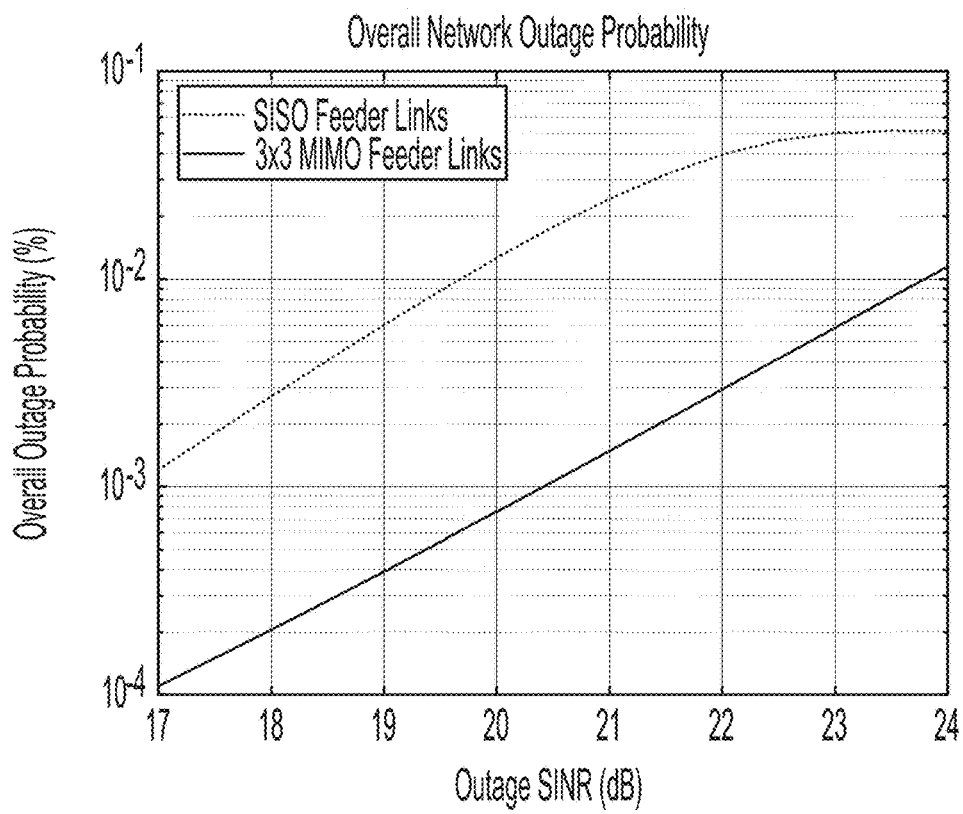
FIG. 13 illustrates overall network outage probability comparison of multiple 3×3 MIMO with SISO feeder links, according to some embodiments.

FIG. 13 illustrates overall network outage probability comparison of multiple 3×3 MIMO with SISO feeder links, according to some embodiments.

FIG. 13 illustrates the overall network outage probability computation when deploying multiple 3×3 MIMO-enabled feeder links where 15 are primary and one feeder link is used for diversity. This corresponds to a total of 45 gateways deployed as primary and 3 added for diversity. When a primary gateway experiences heavy rainfall, its traffic is re-routed to a diversity gateway. The figure indicates that for an outage probability target of 0.01%, state-of-the-art SISO feeder links can only tolerate a threshold SINR of 19.7 dB. In contrast, a 3×3 MIMO feeder links can tolerate a threshold SINR of 23.8 dB, offering more than 4 dB of enhanced overall satellite network availability.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for providing Multi-Input Multi-Output (MIMO) feeder links for a multibeam satellite system, the method comprising:
configuring a X×Y MIMO antenna system using X-antennae having dominant line-of-sight (LoS) of Y-antennae;
transmitting, simultaneously, a Tx signal as X Tx signals on a MIMO channel with the X-antennae;
receiving the X Tx signals on the MIMO channel with the Y-antennae as Y Rx signals, wherein each of the Y-antennae generate one of the Y Rx signals;
ground-interference processing the X Tx signals or the Y Rx signals to recover the Tx signal; and
satellite-interference processing the X Tx signals or the Y Rx signals to recover the Tx signal,
wherein
the ground interference processing comprises countermeasures as either pre-interference processing when the X-antennae are disposed on a ground or post-interference processing when the X-antennae are disposed in a Geosynchronous orbit satellite,
the satellite interference processing comprises a passthrough when a respective Signal-to-Interference-and-Noise Ratio (SINR) of each of the Y Rx signals is greater than a threshold, and
a channel capacity of the MIMO channel is greater than a channel capacity of a Single-Input Single-Output (SISO) channel having resources identical to the MIMO channel.

2. The method of claim 1, wherein X and Y are equal.

3. The method of claim 1, wherein the satellite interference processing comprises countermeasures when the respective SINR of each of the Y Rx signals is less than or equal to the threshold.

4. The method of claim 3, wherein the countermeasures are based on one or more of, a weighted or non-weighted version of, a Zero-Forcing (ZF) criteria, a Minimum Mean-Square Error (MMSE) criteria, or a regularized ZF (RZF) criteria.

5. The method of claim 3, wherein the countermeasures are based on high-quality channel state information (CSI) about signal propagation on the MIMO channel.

6. The method of claim 1, wherein the Y-antennae are disposed in the Geosynchronous orbit satellite, the respective SINR of each of the Y Rx signals less than or equal to the threshold, the satellite interference processing comprises countermeasures, the ground interference processing uses an identity matrix, and weather between one of the X-antennae and the Y-antennae exceeds a precipitation-induced outage limit.

7. The method of claim 1, wherein the Y-antennae are disposed on the ground, the respective SINR of each of the Y Rx signals less than or equal to the threshold, the satellite interference processing comprises a passthrough, the ground interference processing uses a non-identity matrix, and weather between one of the X-antennae and the Y-antennae exceeds a precipitation-induced outage limit.

8. The method of claim 1, wherein when weather, between Z of the X-antennae and the Y-antennae, exceeds a precipitation-induced outage limit, Z diversity antennae are substituted for Z of the X-antennae or the Y-antennae on the ground, the X×Y MIMO antenna system operates as a (X−Z)×Y or X×(Y−Z) MIMO antenna system, and Z is greater than or equal to 1.

9. The method of claim 1, wherein the X-antennae form a cluster, the multibeam satellite system includes M clusters, associating each of the M clusters with a respective Tx signal, each of the clusters transmitting over the MIMO channel simultaneously, M times the channel capacity of the MIMO channel is greater than M times the channel capacity of the SISO channel, and M is greater than 1.

10. The method of claim 9, wherein the clusters are separated from each other by a distance greater than 100 kilometers.

11. The method of claim 1, wherein either the Y-antennae or the X-antennae are spaced in a substantially linear formation on the ground and spaced from one another by a distance of less than 50 kilometers.

12. The method of claim 1, wherein either the Y-antennae or the X-antennae are spaced in a substantially circular formation on the ground and spaced from one another by a distance of less than 50 kilometers.

13. The method of claim 1, wherein either the Y-antennae or the X-antennae are spaced in a substantially linear formation on the Geosynchronous orbit satellite.

14. The method of claim 1, wherein either the Y-antennae or the X-antennae are spaced in a substantially circular formation on the Geosynchronous orbit satellite.

15. The method of claim 1, wherein the X-antennae are interconnected via a fiber or microwave link, and spaced on the ground within an acceptable range of an optimal position.

16. The method of claim 1, wherein the Y-antennae are interconnected via a fiber or microwave link, and spaced on the ground within an acceptable range of an optimal position.

17. The method of claim 1, wherein the X Tx signals are substantially orthogonal at the Y-antennae.

* * * * *